United States Patent
Tsujimori et al.

(10) Patent No.: US 12,043,441 B2
(45) Date of Patent: Jul. 23, 2024

(54) BOX UNPACKING DEVICE AND METHOD OF UNPACKING BOX USING THE SAME

(71) Applicant: KAWASAKI JUKOGYO KABUSHIKI KAISHA, Kobe (JP)

(72) Inventors: Toshiyuki Tsujimori, Kobe (JP); Kentaro Azuma, Kobe (JP); Yukio Iwasaki, Kobe (JP); Ippei Nagahiro, Kobe (JP); Kazunori Hirata, Kobe (JP); Shoichi Miyao, Kobe (JP); Hideshi Yamane, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 557 days.

(21) Appl. No.: 17/295,088

(22) PCT Filed: Nov. 19, 2019

(86) PCT No.: PCT/JP2019/045261
§ 371 (c)(1),
(2) Date: Feb. 10, 2022

(87) PCT Pub. No.: WO2020/105631
PCT Pub. Date: May 28, 2020

(65) Prior Publication Data
US 2022/0219857 A1    Jul. 14, 2022

(30) Foreign Application Priority Data

Nov. 19, 2018 (JP) .................. 2018-216786

(51) Int. Cl.
*B25J 9/16* (2006.01)
*B25J 11/00* (2006.01)
*B25J 13/08* (2006.01)
*B65B 69/00* (2006.01)

(52) U.S. Cl.
CPC ......... *B65B 69/0033* (2013.01); *B25J 9/1679* (2013.01); *B25J 11/0055* (2013.01); *B25J 13/088* (2013.01)

(58) Field of Classification Search
None
See application file for complete search history.

(56) References Cited

U.S. PATENT DOCUMENTS

2013/0125517 A1* 5/2013 Gomi .................. B65B 69/0033
                                                       53/381.1
2021/0130025 A1* 5/2021 Schaafsma ............ B65B 59/003

FOREIGN PATENT DOCUMENTS

| CN | 103086028 A | 5/2013 |
| CN | 207712447 U | 8/2018 |
| JP | H02-191133 A | 7/1990 |
| JP | H03-69432 A | 3/1991 |
| JP | 2008001431 A * | 1/2008 |
| JP | 2013-100118 A | 5/2013 |

* cited by examiner

*Primary Examiner* — Chinyere J Rushing-Tucker
(74) *Attorney, Agent, or Firm* — Oliff PLC

(57) ABSTRACT

A box unpacking device includes a robot, and a cutting device. A robot hand is attached to a wrist of the robot. The robot hand has a holding device configured to hold a packed box. The cutting device has a cutting blade of which the point is oriented downward or obliquely downward. The robot can move the box held by the holding device in a vertical plane, and change an angle of the box in the vertical plane.

24 Claims, 23 Drawing Sheets

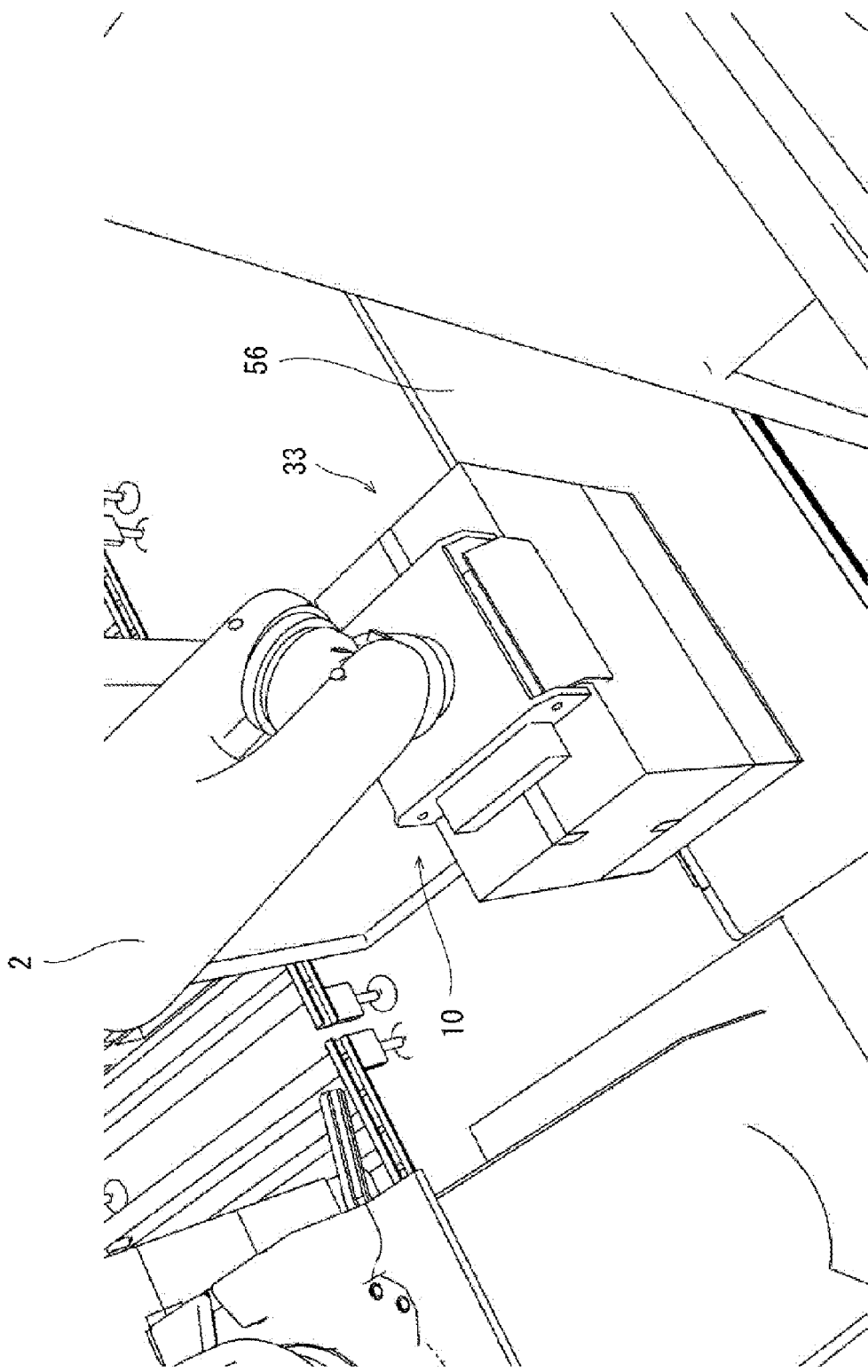

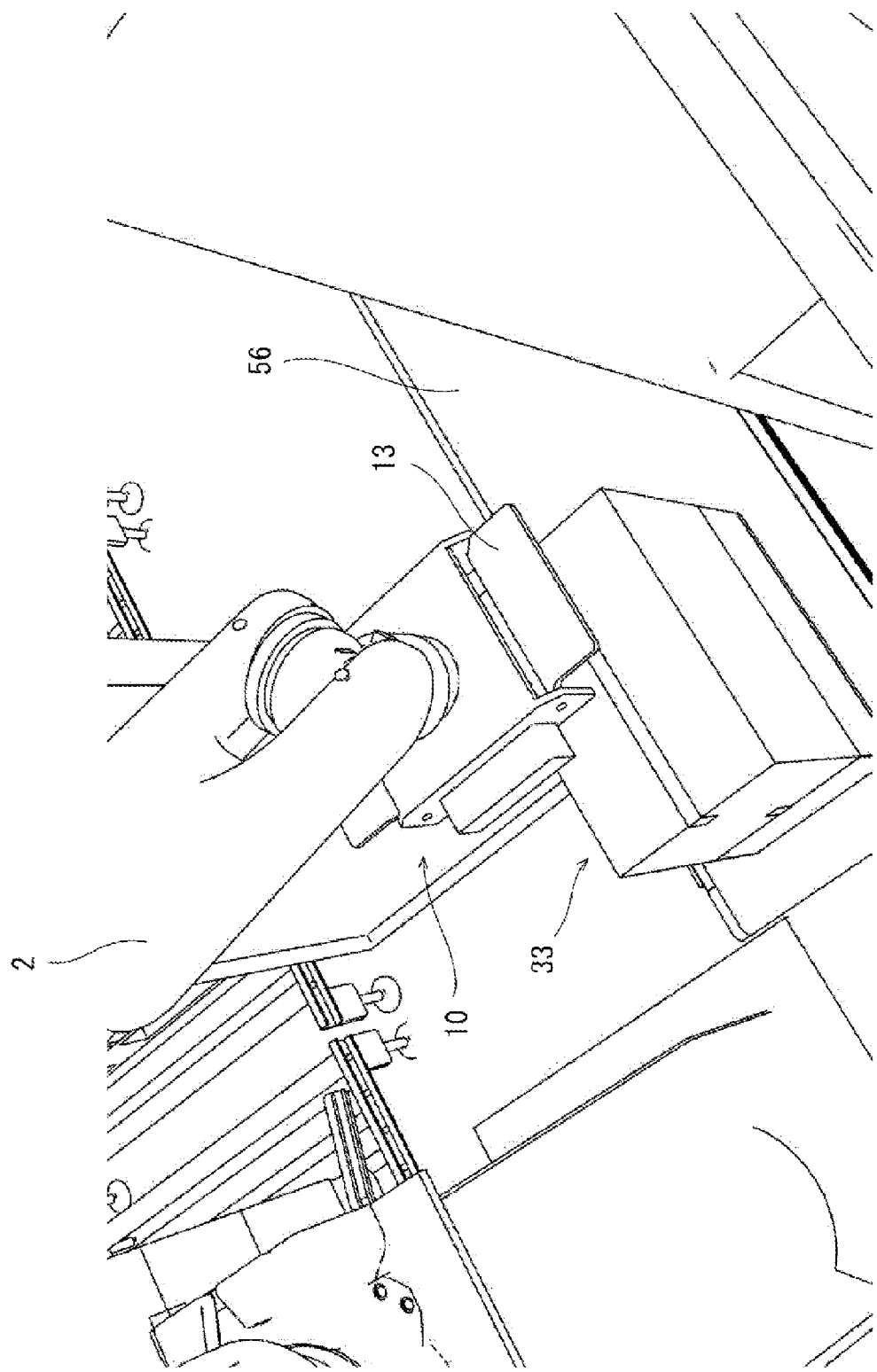

BOX UNPACKING DEVICE AND METHOD OF UNPACKING BOX USING THE SAME

TECHNICAL FIELD

The present disclosure relates to a device which unpacks a box which is boxed and sealed, and takes out item(s) accommodated inside the box, and a method using the same.

BACKGROUND ART

Patent Document 1 etc. proposes a device including a robot for unpacking a cardboard box which is boxed and sealed, and taking out accommodated item(s) inside the box.

REFERENCE DOCUMENT OF CONVENTIONAL ART

Patent Document

[Patent Document 1] JP2013-100118A

DESCRIPTION OF THE DISCLOSURE

Problem to be Solved by the Disclosure

According to the device of Patent Document 1 described above, the cardboard box is cut with a blade of a packing material cutting part. However, the packing material cutting part is installed in a conveying path, and thus, it can only deal with cardboard boxes of a given size and a given seal type. That is, it is difficult to deal with boxes of various sizes and various seal types.

The present disclosure is made in view of such a situation, and one purpose thereof is to provide a box unpacking device and a method of unpacking a box which are capable of dealing with boxes of various sizes and various seal types.

SUMMARY OF THE DISCLOSURE

A box unpacking device according to one aspect of the present disclosure includes a robot and a cutting device. A robot hand is attached to a wrist of the robot. The robot hand has a holding device configured to hold a packed box. The cutting device has a cutting blade of which the point is oriented downward or obliquely downward, and the robot moves the box held by the holding device in a vertical plane.

According to this configuration, the robot can move the box held by the holding device upward in the vertical plane to press the surface to be cut open against the cutting blade, and can move the box along the extending direction of the point of the cutting blade in the vertical plane to cut open the surface to be cut open. Therefore, the box can be unpacked while dealing with the various sizes of the box and various seal types. In addition, since the surface of the box is oriented upward when it is cut open, an accommodated item(s) inside the box is brought closer to the lower part by its own weight, thereby reducing the possibility of the damage to the accommodated item(s) by the cutting blade.

The robot may include a robot body including the wrist to which the robot hand having the holding device is attached, and a robot controller configured to control operation of the robot body and the holding device. The robot controller may control the robot body so that the robot body holds the box located at a given position by the holding device and moves the box held by the holding device at least in the vertical plane to cut open an upwardly oriented surface of the box by the cutting blade to open the box.

Here, "cutting open the surface of the box" means that a cut line which can reach an interior space, or a linear opening is formed in the surface of the box.

According to this configuration, the robot body is controlled automatically or manually to unpack the box while dealing with the various sizes of the box and the various seal types.

The controller may control the robot body so that the robot body holds a surface of the box other than the upper surface while placing the wrist at the side of the box, and then moves the box at least in the vertical plane to cut open the upper surface of the box by the cutting blade to open the box.

According to this configuration, the upper surface of the box can be cut open. When the up-and-down direction does not exist in the accommodated item(s), the opened box can be further flipped upside down to drop the accommodated item(s), so that the accommodated item(s) can be taken out from the box.

The robot may further change an angle of the box held by the holding device in a rotating direction in which the box is flipped upside down.

According to this configuration, since the lower surface of the box held by the holding device can be made to face the cutting blade, the lower surface of the box can be cut open.

The robot may include a robot body including the wrist to which the robot hand having the holding device is attached, and a robot controller configured to control operation of the robot body and the holding device. The robot controller may control the robot body so that the robot body changes the angle of the box held by the holding device at least in the rotating direction in which the box is flipped upside down, and then cuts open, by the cutting blade, a surface of the box that is oriented upward or obliquely upward to open the box.

The robot controller may control the robot body so that the robot body holds at least the upper surface of the box while placing the wrist above the box, then changes the angle of the held box in the rotating direction in which the box is flipped upside down, and then moves the box at least in the vertical plane to cut open, by the cutting blade, a lower surface of the box that is oriented upward or obliquely upward by the angle change to open the box.

According to this configuration, in a case where the box located at a given position is arranged such that only the upper surface thereof can be held (e.g., a case where a large number of boxes are stuck in multiple stages and, in each stage, a plurality of boxes are arranged in a matrix form, and the box located at the give position is a box in the uppermost stage), the box located at the given position can easily be held and the lower surface of the box can be cut open.

The robot controller may control the robot body so that the robot body holds a surface of the box other than a lower surface while placing the wrist at the side of the box, then changes the angle of the held box in the rotating direction in which the box is flipped upside down, and then moves the box at least in the vertical plane to cut open, by the cutting blade, the lower surface of the box that is oriented upward or obliquely upward by the angle change to open the box.

According to this configuration, in a case where the box located at a given position is arranged such that the side surface thereof can be held (e.g., a case where a large number of boxes are arranged in line and the box located at the give position is a box at the front end), the box located at the given position can easily be held and the lower surface of the box can be cut open.

The robot controller may control the robot body so that the robot body opens the box held by the holding device, and turns the surface cut open by the cutting blade downward to drop the accommodated item of the box.

According to this configuration, the accommodated item(s) of the opened box can be taken out easily by the robot.

The box may have a bottom surface, a top surface opposing to the bottom surface, and a side surface connecting the entire perimeter of the bottom surface and the entire perimeter of the top surface. The box may be located at the given position so that the top surface becomes the upper surface. The robot controller may control the robot body so that the robot body holds a surface of the box other than the bottom surface while placing the wrist above the box, then changes the angle of the held box in the rotating direction in which the box is flipped upside down, and then moves the box at least in the vertical plane to cut open, by the cutting blade, the bottom surface of the box that is oriented upward or obliquely upward by the angle change to open the box, and then turns the bottom surface cut open by the cutting blade downward to drop an accommodated item of the box.

According to this configuration, the robot can cut open the bottom surface to open the box, and turn the opened box upside down to take out the accommodated item(s). As a result, when the up-and-down direction exists in the accommodated item(s), the accommodated item(s) can be taken out in a proper direction.

The boxes may be placed as a box aggregate on a pallet. The holding device may be provided with a box position detector configured to detect the position of the box. The robot controller may hold, by the holding device, the box located at the given position of the box aggregate placed on the pallet based on the position of the box detected by the box position detector.

When the robot is program controlled, a box which is a detection target is designated in advance and the position thereof is also identified. However, the actual position of the box includes an error originating from the position error of the pallet, the arrangement error of the box when forming the box aggregate, etc. According to this configuration, for example, by correcting the position of the detection-target box to the position which is detected by the box position detector, the box can be held exactly.

The cutting blade of the cutting device may be disposed at a position where the robot is able to move the holding device of the robot hand below the cutting blade.

According to this configuration, the robot can press the box held by the holding device against the cutting blade from below the cutting blade, and can cut open the box.

The robot may be a vertical articulated robot.

According to this configuration, since the robot can put against the cutting blade the box held by the holding device in a given posture so as to cut open the box, the box can be unpacked easily while dealing with the various sizes of the box and the various seal types.

Moreover, a method of unpacking a box according to another aspect of the present disclosure is a method of unpacking a box by using a box unpacking device including a robot and a cutting device, a robot hand being attached to a wrist of the robot, the robot hand having a holding device configured to hold a packed box, and the cutting device having a cutting blade of which the point is oriented downward or obliquely downward. The method includes the step of (A) moving, by the robot, the box held by the holding device in a vertical plane.

According to this configuration, the box can be unpacked while dealing with the various sizes of the box and the various seal types. In addition, since the surface of the box is oriented upwardly when it is cut open, the accommodated item(s) inside the box is brought closer to the lower part by its own weight, thereby reducing the possibility of the damage to the accommodated item(s) by the cutting blade.

Effect of the Disclosure

According to the box unpacking device of the present disclosure, the box can be unpacked to take out the accommodated item(s) therein without damaging the accommodated item(s) inside the box, while dealing with the various sizes of the box and the various seal types.

BRIEF DESCRIPTION OF DRAWINGS

FIG. 8N is a view illustrating an empty box discharging operation.

FIG. 8O is a view illustrating the empty box discharging operation.

MODES FOR CARRYING OUT THE DISCLOSURE

Figure 1:
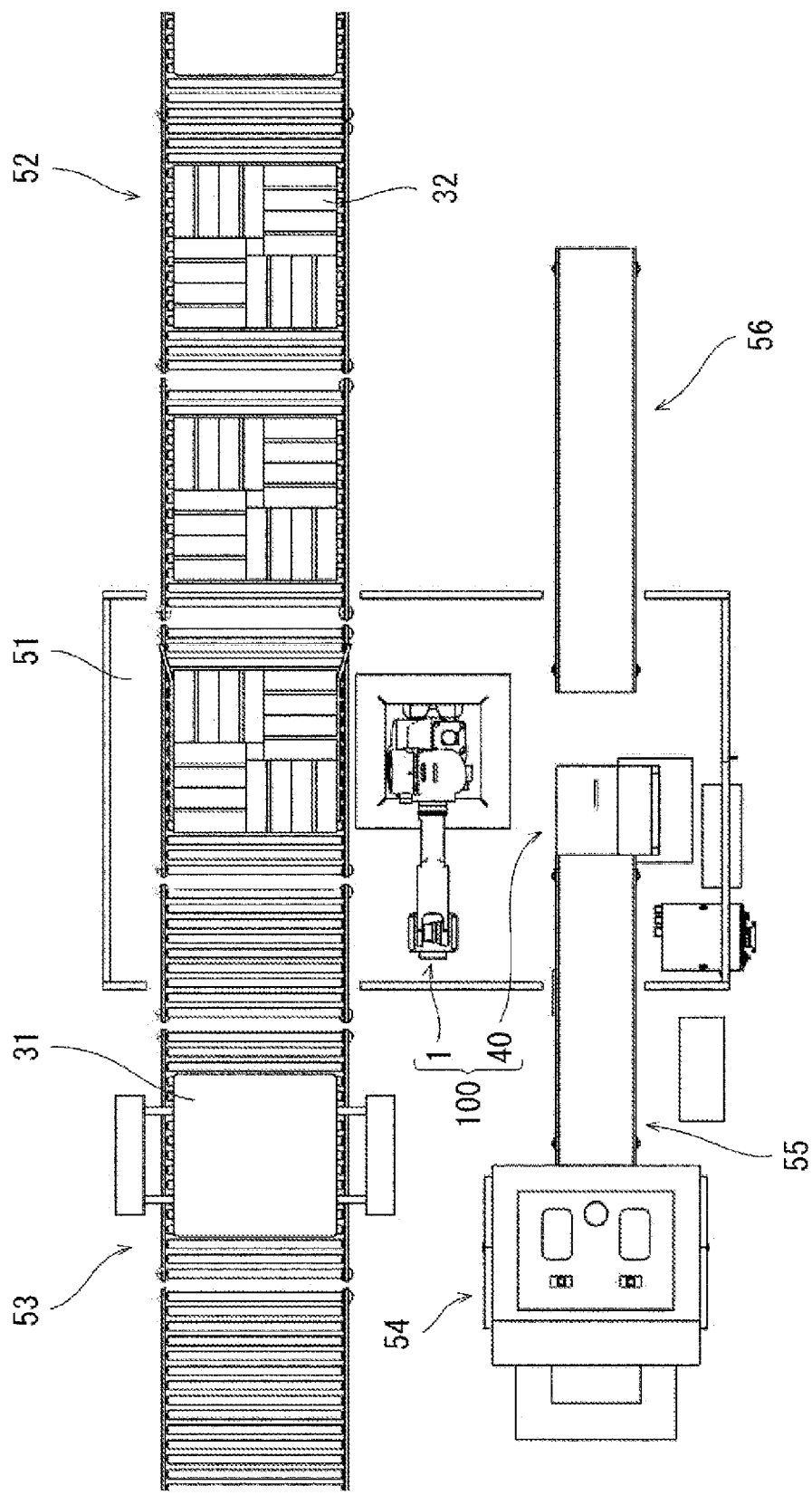
FIG. 1 is a layout design view of one example of a box unpacking system including a box unpacking device of one embodiment of the present disclosure.

Hereinafter, embodiments of a box unpacking device of the present disclosure will be described with reference to the drawings. Note that, below, the same reference characters are assigned to the same or corresponding elements throughout the drawings to omit redundant description. Moreover, since the following drawings are to explain the present disclosure, an element which is unrelated to the present disclosure may be omitted, the dimension may not be exact because of an exaggeration etc., and the mutually-corresponding elements may not match up with each other in a plurality of drawings. Moreover, the present disclosure is not limited to the following embodiments.

Embodiment

Figure 2:
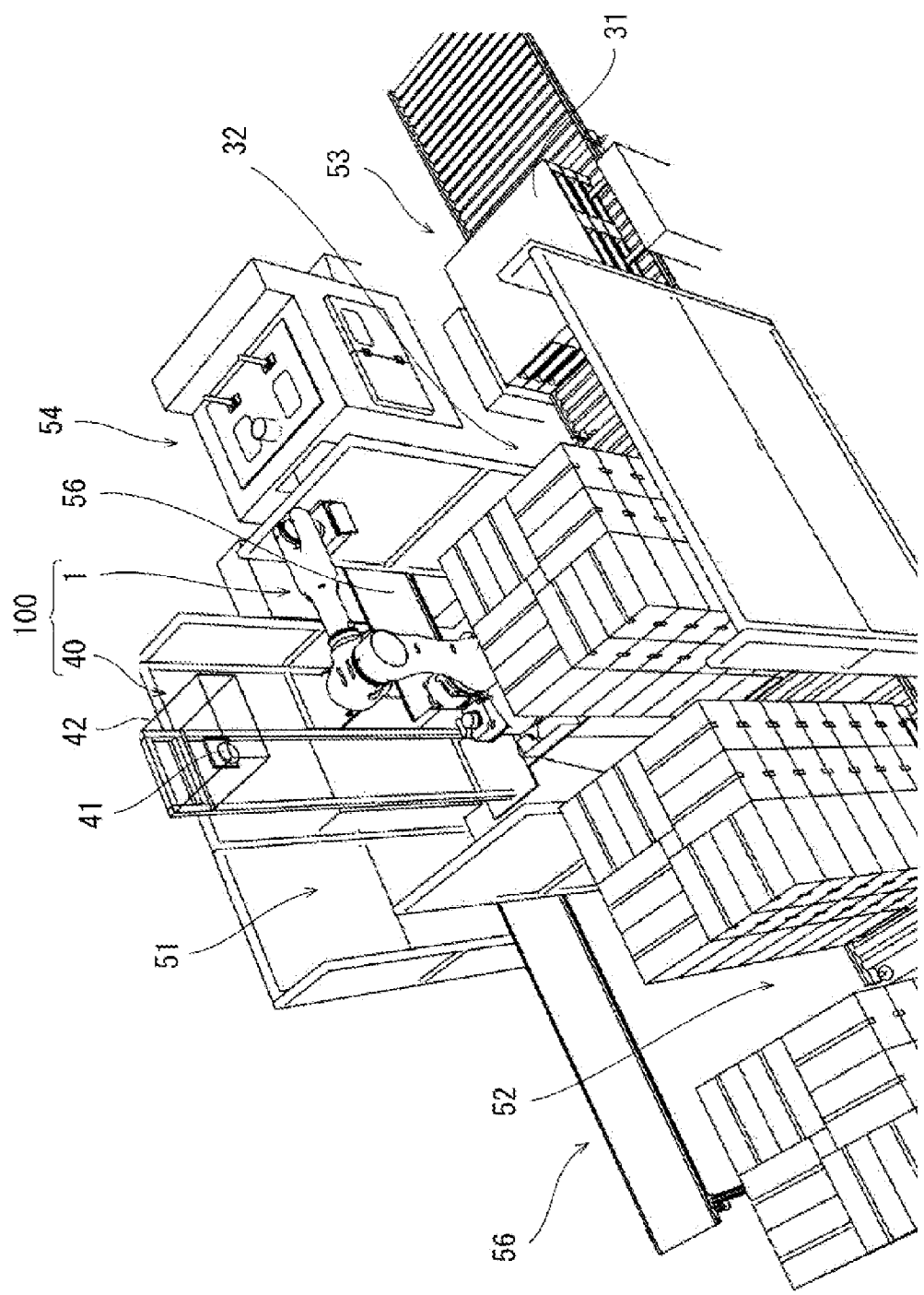
FIG. 2 is a perspective view illustrating a robot and a depalletizing area.
Figure 3:
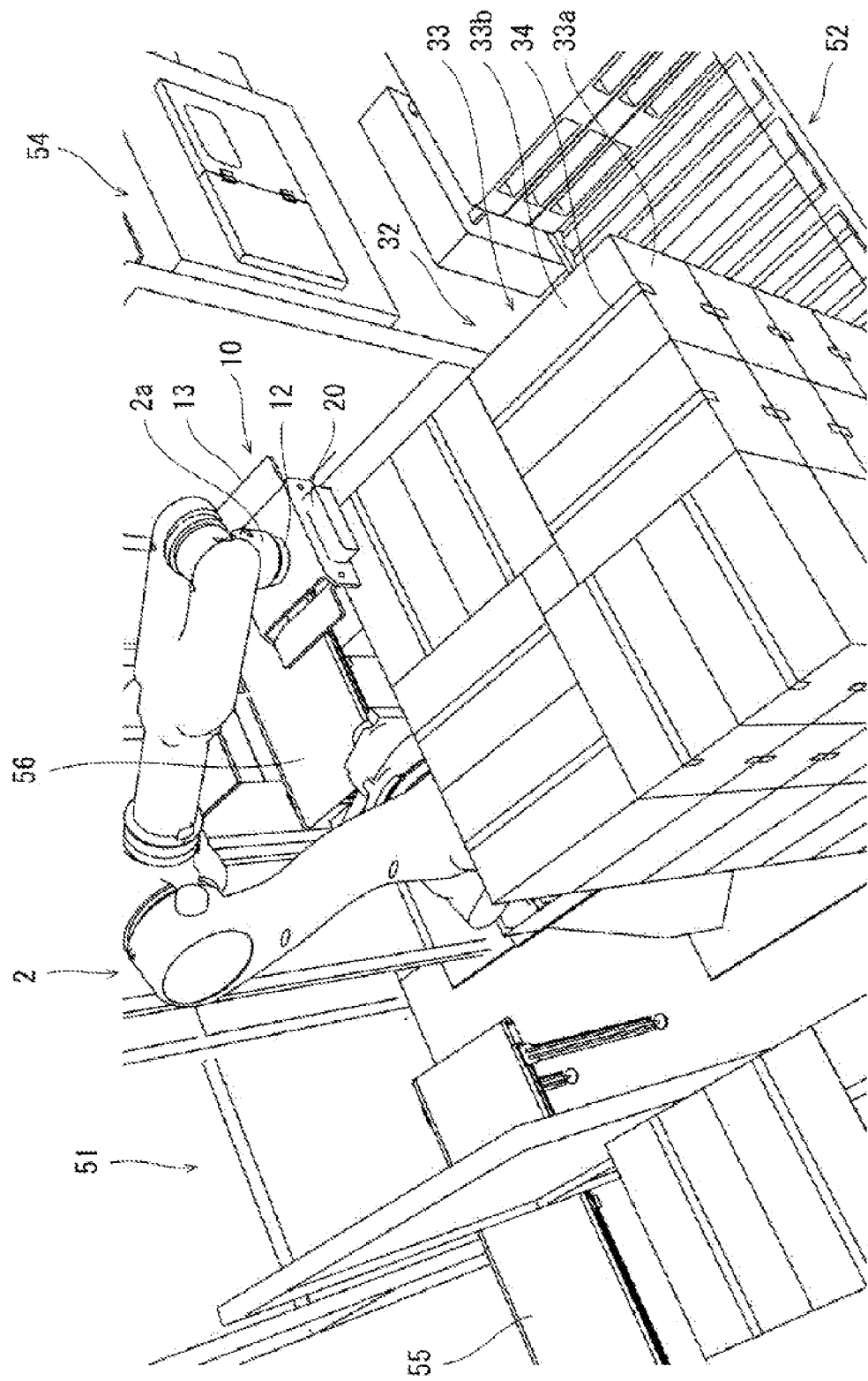
FIG. 3 is a view illustrating a box position measuring operation which is the first half of a depalletizing operation.
Figure 4:
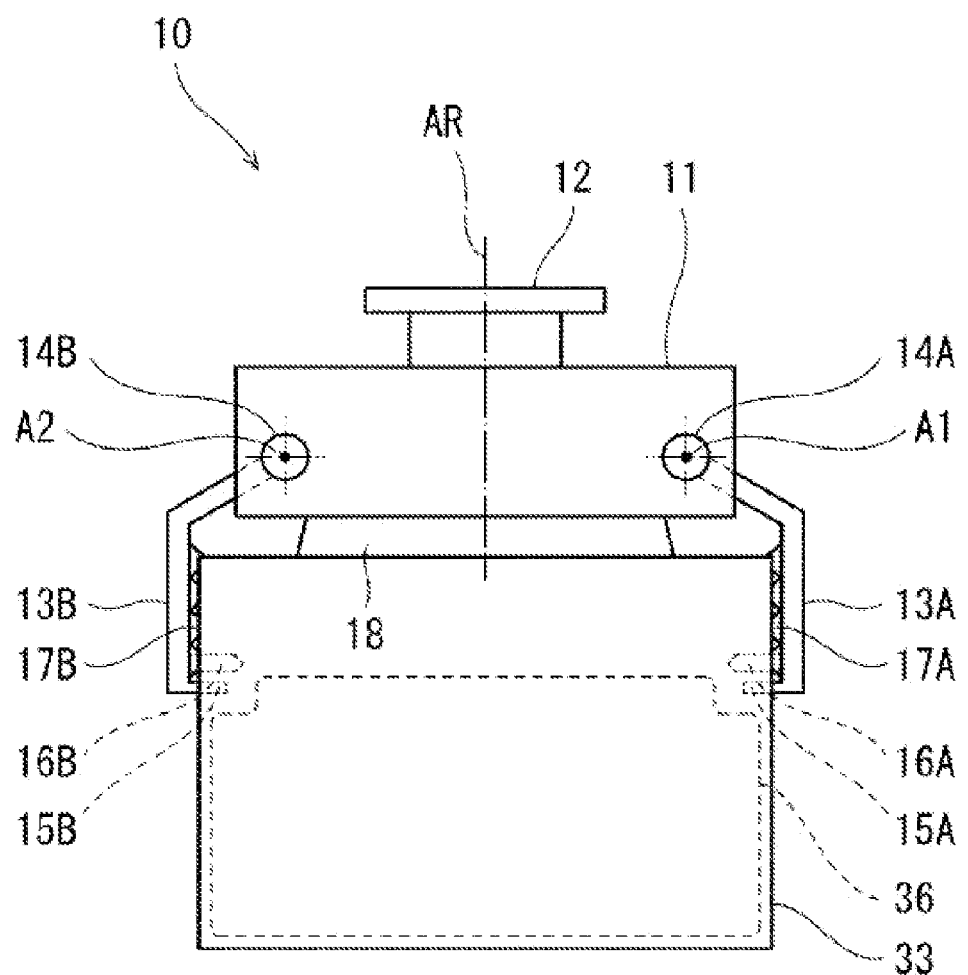
FIG. 4 is a front view illustrating a configuration of a holding device.

FIG. 1 illustrates one example of a layout design view for a box unpacking system including a box unpacking device of one embodiment of the present disclosure. FIG. 2 is a perspective view illustrating a robot and a depalletizing area. FIG. 3 is a view illustrating a box position measuring operation which is the first half of a depalletizing operation. FIG. 4 is a front view illustrating a configuration of a holding device. This box unpacking system is also a work environment of a box unpacking device 100.

[Configuration]

{Configuration of Hardware}

Referring to FIGS. 1 to 4, the box unpacking system includes a robot 1, a cutting device 40, a depalletizing area 51, an actual pallet conveyor 52, a pallet magazine 53, a bag unpacking machine 54, a product taking-out conveyor 55, and an empty box discharging conveyor 56. The robot 1 and the cutting device 40 constitute the box unpacking device 100. Operation of the robot 1 is controlled by a robot controller 3 (FIG. 5), and operations of the components of the box unpacking system other than the robot 1 are controlled by a system controlling device (not illustrated). The control of the operation of the robot 1 and the control of the box unpacking system are performed coordinatively with each other.

In this box unpacking system, a pallet 31 where a box aggregate 32 which is formed by suitably gathering cardboard boxes (hereinafter, simply referred to as "the box") 33 is placed (disposed) (hereinafter, the pallet where the box aggregate 32 is placed is referred to as "the actual pallet") is conveyed on the actual pallet conveyor 52, and it is stopped at the depalletizing area 51. Accommodated item(s) (product(s)) 36 is accommodated inside the box 33, and the box 33 is sealed (closed) by a tape 34. When the actual pallet 31 is stopped, the robot 1 picks up the box 33 from the box aggregate 32, opens the box 33 by using the cutting device 40, and drops the accommodated item(s) 36 on the product taking-out conveyor 55. Then, the product taking-out conveyor 55 conveys the accommodated item(s) 36 to the bag unpacking machine 54, and the bag unpacking machine 54 opens a bag of the accommodated item(s) 36 and suitably processes the accommodated item. The robot 1 drops the empty box 33 on the empty box discharging conveyor 56. Then, the empty box discharging conveyor 56 takes out the empty box 33. When a series of box unpacking operations are repeated and the top of the pallet 31 becomes empty, the empty pallet 31 is conveyed to the pallet magazine 53 and the next actual pallet 31 is stopped at the depalletizing area 51, by the actual pallet conveyor 52. The empty pallets 31 are stacked on the pallet magazine 53.

Next, the box unpacking device 100 is described in detail.

<Robot 1>

The robot 1 may have, at a wrist 2a, a robot hand including a holding device 10 which holds a packed box 33, and be capable of moving the box 33 held by the holding device 10 in a vertical plane. It is because, by the robot 1 moving the box 33 held by the holding device 10 upwardly in the vertical plane, a surface to be cut open can be pressed against a cutting blade 41, and by moving the box 33 in an extending direction of the point of the cutting blade 41 in the vertical plane, the surface to be cut can be cut open. Here, "cutting open the surface of the box 33" means that a cut line which can reach an interior space, or a linear opening is formed in the surface of the box 33. The robot 1 may further change the angle of the box 33 held by the holding device 10 in a rotating direction in which the box 33 is made upside down. According to this configuration, since a lower surface of the box 33 held by the holding device 10 can be turned toward the cutting blade 41, the lower surface of the box 33 can be cut open.

In this embodiment, the robot 1 can move the box 33 held by the holding device 10 in the vertical plane, and can change the angle of the box 33 held by the holding device 10 in the rotating direction in which the box is flipped upside down.

The robot 1 may be a vertical articulated robot, a horizontal articulated robot, a delta robot, a parallel link robot, or a robot dedicated for box unpacking.

Figure 5:
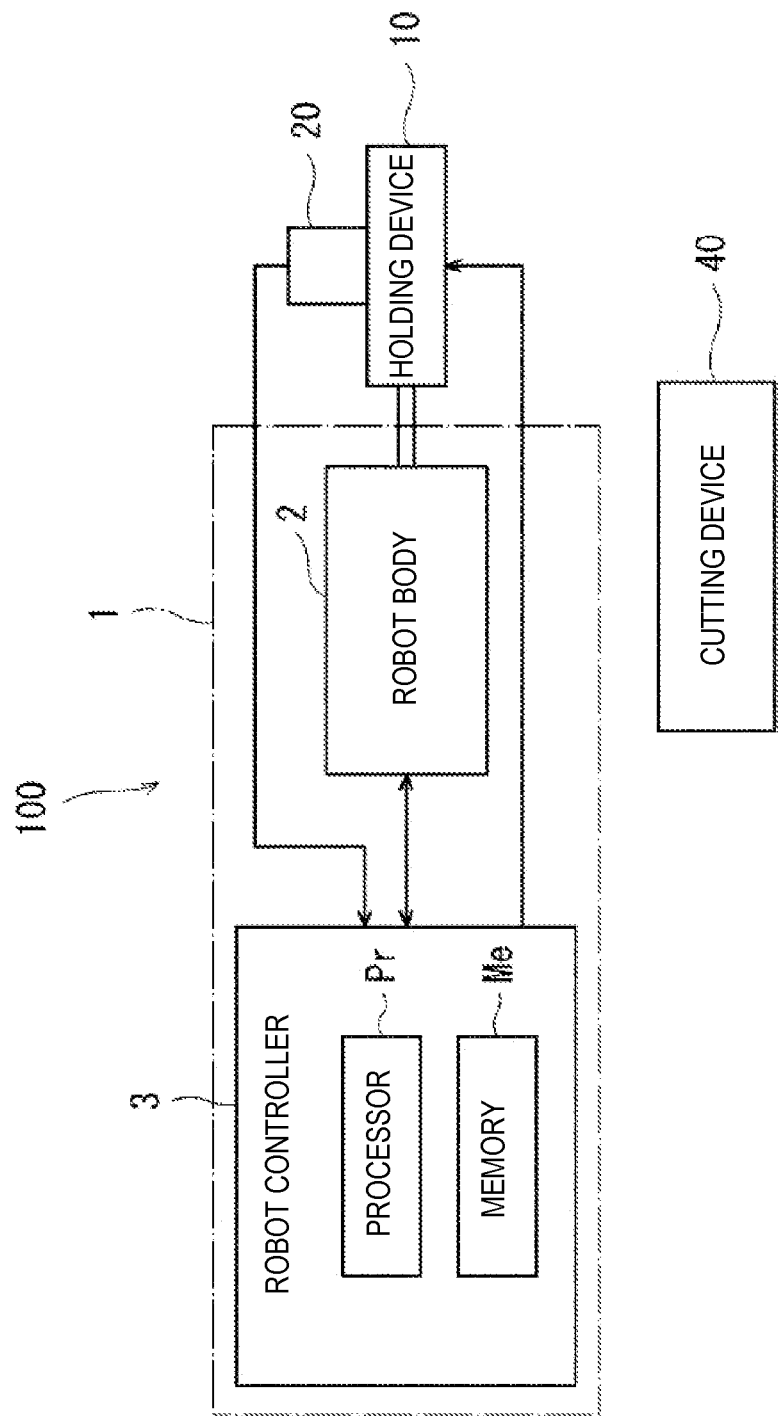
FIG. 5 is a block diagram illustrating a configuration of a control system of the box unpacking device of FIG. 1.

The robot 1 includes a robot body 2 and a robot controller 3 (see FIG. 5).

Referring to FIG. 3, the robot 1 is comprised of, for example, a 6-axis vertical articulated robots, and the robot body 2 is comprised of a vertical articulated robotic arm. Since the vertical articulated robot is well-known, the detailed description is omitted. A robot hand provided with the holding device 10 (here, substantially, the robot hand is only comprised of the holding device 10) is attached to the wrist 2a of the robot body 2.

<Cardboard Box 33>

The box 33 may be what can accommodate the accommodated item(s) 36 therein and can be sealed (closed), and can be cut open by the cutting blade 41. The form of the box 33 is not limited in particular. Here, the box 33 is configured to have a bottom surface, a top surface which opposes to the bottom surface, and a side surface which connects the entire perimeter of the bottom surface and the entire perimeter of the top surface. In detail, the box 33 is a cardboard box which is boxed (where item(s) is accommodated). Here, the shape of the box 33 is a rectangular parallelepiped, for example. The box 33 is comprised of a body part 33a of a rectangular pillar shape comprised of four side walls of the rectangular parallelepiped, and flaps 33b formed at an upper end and a lower end of each side wall of the body part 33a. A top wall and a bottom wall are formed by bending and suitably combining the flaps 33b, and closing both the end surfaces of the rectangular-pillar-shaped body part 33a. Note that, in this embodiment, when not distinguishing the upward and downward directions of the box 33 in particular, the walls at both the ends of the rectangular-pillar-shaped body part 33a are referred to as "the end wall(s)." Each end wall is sealed with an adhesive tape (hereinafter, simply referred to as "the tape") 34 so that the flaps 33b will not open. Although the shape and the number of flap(s) 33b and the sealing mode by the tape 34 may be changed variously according to the form of the end walls of the box 33, they are as follows if a general form is described.

For example, there is a box in which each of a pair of opposing short sides and a pair of opposing long sides of the end surface of the rectangular of the body part 33a is used as a bendable part, and the end wall is formed by the flaps 33b for the pair of short sides having the same rectangular shape and the flaps 33b for the pair of long sides having the same rectangular shape, which extend from the respective pairs of bendable parts. By bending the bendable parts of the pair of short sides of the rectangular end surface, the flaps 33b for the pair of short sides are made to extend along the end surface with a gap therebetween. Then, by bending the bendable parts of the pair of long sides of the rectangular end surface, free edges of the flaps 33b for the pair of long sides are abutted to each other. Then, the tape 34 pastes together the flaps 33b for the pair of long sides so that it covers the abutted part and straddles the flaps 33b for the pair of long sides. As a result, side edges of the flaps 33b for the long sides overlap with the bendable parts of the short sides of the body part 33a. The tape 34 pastes together the flaps 33b for the long sides and the side walls of the box 33 so that it covers the overlapping part and straddles the flaps 33b for the long sides and the bendable parts of the short sides of the body part 33a. Normally, the pasting of the side edges of the flaps 22 for the long sides and the short sides of the body part 33a is performed at two locations of the body part 33a. As a result, when the end wall is seen as a front view, the tape 34 forms the H-shape (hereinafter, this pasting mode of the tape is referred to as the "H-shaped tape pasting mode"). Note that the pasting of the side edges of the flaps 22 for the long sides and the short sides of the body part 33a may be omitted. In this case, if the end wall is seen as the front view, the tape 34 forms the I-shape (hereinafter, this pasting mode of the tape 34 is referred to as the "I-shape tape pasting mode"). In this embodiment, the I-shape tape pasting mode is illustrated. However, the box unpacking operation which will be described below may completely be applied to the H-shaped tape pasting mode.

Moreover, the following is another mode. The end wall is comprised of a single flap 33b. The flap 33b overlaps at its edge with a bottom edge of the side wall of the body part 33a, and the tape 34 pastes together the flap 33b and the side wall of the body part 33a so that it covers the overlapping part and straddles the flap 33b and the side wall of the body part 33a.

<Box Aggregate 32>

Referring to FIG. 3, the boxes 33 are stacked so as to form the box aggregate 32 on the pallet 31. The box aggregate 32 may be the boxes 33 disposed regularly. The reason why the regularity is required is that it is necessary to identify the position of each box 33 on the pallet 31 in order for the robot 1 to hold the box 33 disposed on the pallet 31.

In detail, for example, the box aggregate 32 is comprised of one or more stacked stages, which forms, as a whole, a rectangular pillar shape with the flush circumferential surfaces. Each stage is comprised of one or more boxes 33 placed so as to form a geometric shape as a whole in a plan view. Here, the geometric shape is square. Of course, it may be other geometric shapes. Each box 33 is placed so that its top surface becomes an upper surface.

<Cutting Device 40>

Referring to FIG. 2, the cutting device 40 is installed near the robot 1. The cutting device 40 has the cutting blade 41, of which the point is oriented downwardly. Note that the point of the cutting blade 41 may be oriented obliquely downwardly. The cutting blade 41 may have the point which is oriented downwardly or obliquely downwardly. The shape of the cutting blade 41 is not limited in particular, but it may be a disk, knife, or chain saw shape. The cutting blade 41 may be fixed or movable.

The cutting blade 41 is disposed at a position where the robot 1 is able to move the holding device 10 below the cutting blade 41. This is because the robot 1 can press the box 33 held by the holding device 10 against the cutting blade 41 from below the cutting blade 41, and can cut open the box 33, if the cutting blade 41 is disposed in this way.

In detail, the cutting device 40 includes the cutting blade 41 of a disk shape, and a carrier 42, for example. In FIG. 2 (and FIGS. 8D-8H and J), the carrier 42 is drawn transparently for convenience of description. The carrier 42 is supported by a suitable support structure at a necessary height, and is formed in a frame where a lower end thereof opens. Further, the cutting blade 41 is rotatably attached to the carrier 42 in a vertical plane through a horizontal rotation axis 42a (see FIG. 8I). A lower end of the cutting blade 41 is exposed from the lower end of the carrier 42. The cutting blade 41 is rotated by a motor (not illustrated), for example.

<Accommodated Item (Product) 36>

The accommodated item 36 (see FIG. 4) is not limited in particular. It may be a product or a postal item. The product may include a bagged product (for example, a foodstuff, a plastic bag where nuts are stuffed, a commodity), an industrial material, and a component.

<Holding Device 10>

Here, referring to FIGS. 3 and 4, the holding device 10 includes a body part 11, an attaching part 12, a pair of gripper members 13A and 13B, a suction part 18, and a three-dimensional (3D) position measuring instrument (box position detector) 20. Note that, in FIG. 4, illustration of the 3D position measuring instrument 20 is omitted. The 3D position measuring instrument 20 will be described later in detail. Moreover, in FIG. 4, for convenience, a left-and-right direction and an up-and-down direction in the drawing are defined as a left-and-right direction and an up-and-down direction of the holding device 10, respectively.

The body part 11 is formed in a frame which has an inverted U-shape in the cross section when seen in the left-and-right direction, and extends in the left-and-right direction (particularly, see FIG. 3).

The attaching part 12 of a cylindrical shape having a flange at a tip end is provided so as to stand upwardly from a center part of the body part 11. The center axis of the attaching part 12 constitutes a reference axis AR of the holding device 10. The holding device 10 is attached to the wrist 2a of the robot body (robotic arm) 2 so that the reference axis AR becomes in agreement with the twist-rotation axis of the wrist 2a. Moreover, as will be described later, the holding device 10 is positioned so that, by the robot body 2, the body part 11 is located above the cardboard box 33 and the reference axis AR is substantially in agreement with the center axis of the cardboard box 33.

FIG. 4 illustrates the holding device 10 in a posture where the reference axis AR extends in the up-and-down direction (vertically).

The pair of gripper members 13A and 13B are attached to the body part 11 so that their base-end parts are separated by a given distance in a given direction perpendicular to the reference axis AR (here, the left-and-right direction). The base-end parts of the pair of gripper members 13A and 13B are attached to the body part 11 so as to be rotatable on a pair of rotation axes A1 and A2 perpendicular to the extending direction of the reference axis AR and the given direction. The parts of the body part 11 to which the base-end parts of the pair of gripper members 13A and 13B are attached, respectively, are separated from the reference axis AR of the body part 11 by an equal distance in the given direction. The pair of gripper members 13A and 13B are driven by a pneumatic controlling circuit (not illustrated). In the drawings other than FIGS. 4 and 8I, the pair of gripper members 13A and 13B are illustrated by one reference character "13" for simplification.

The pair of gripper members 13A and 13B are formed, for example, when seen in the extending directions of the respective rotation axes A1 and A2, in a plate shape having a cross-sectional shape bent in a direction or to the side in which the pair of gripper members 13A and 13B approach each other (hereinafter, referred to as inward or the inside).

Pawls 15A and 15B which protrude inwardly are provided at tip ends of the pair of gripper members 13A and 13B, respectively. Moreover, friction members 17A and 17B are attached to parts of inner surfaces of the pair of gripper members 13A and 13B, on the tip-end sides from the bent parts, respectively. The pair of friction members 17A and 17B may be members with a large friction coefficient, and the pair of friction members 17A and 17B may be members made of rubber, sponge, or sandpaper.

The length and the bending degree of the pair of gripper members 13A and 13B are set (designed) so that, in a state where the body part 11 is located above the cardboard box 33 (in detail, in a state where the suction part 18 sucks a center part of the upper surface of the cardboard box 33), for example, the pair of pawls 15A and 15B may be stuck into upper parts of the left-and-right side walls of the cardboard box 33, respectively, and the pair of friction members 17A and 17B contact the upper parts of the left-and-right side walls of the cardboard box 33, respectively.

However, depending on the state of the accommodated item(s) 36 (for example, when the number of accommodated items 36 is small), the length and the bending degree of the pair of gripper members 13A and 13B may be set (designed) so that, in a state where the body part 11 is located above the cardboard box 33 (in detail, in a state where the suction part 18 sucks the center part of the upper surface of the cardboard box 33), the pair of pawls 15A and 15B are stuck into a part of any one of the left-and-right side walls of the cardboard box 33, and the pair of friction members 17A and 17B contact a part of any one of the left-and-right side walls of the cardboard box 33.

The suction part 18 is provided to a lower surface of the body part 11. The suction part 18 is comprised of a vacuum suction pad, for example. The suction part 18 is provided, for example, so that the center axis is in agreement with the reference axis AR. The suction part 18 performs sucking/releasing operation by the pneumatic controlling circuit described above.

<3D Position Measuring Instrument 20>

As illustrated in FIG. 3, the 3D position measuring instrument 20 as the box position detector is provided to a side part of the body part 11 of the holding device 10. The 3D position measuring instrument 20 measures a three-dimensional position of the box 33. The 3D position measuring instrument 20 may be comprised of a three-dimensional vision camera, an image sensor, or an ultrasonic distance sensor, for example. Here, the 3D position measuring instrument 20 is comprised of the three-dimensional vision camera.

{Configuration of Control System}

FIG. 5 is a block diagram illustrating a configuration of a control system of the box unpacking device 100 of FIG. 1.

Referring to FIG. 5, the robot controller 3 is comprised of a sole controller which performs a centralized control or a plurality of controllers which perform a distributed control. Here, the robot controller 3 is comprised of the sole controller which performs the centralized control. The installed location of the robot controller 3 is not limited in particular. The robot controller 3 is installed at a base part (see FIG. 2) of the robot body 2, for example. The robot controller 3 is provided with a processor Pr and a memory Me, for example. The robot controller 3 controls operations of the robot body 2 and the holding device 10 by the processor Pr reading and executing a given control program stored in the memory Me. In detail, the robot controller 3 is comprised of a microcontroller, an MPU, an FPGA (Field Programmable Gate Array), a PLC (Programmable Logic Controller), or a logic circuit, for example.

In detail, the robot controller 3 controls the motor which drives each joint of the robot body 2 to control operation of the robot body 2, and controls the pneumatic controlling circuit of the holding device 10 to control operation of the holding device 10. Moreover, the robot controller 3 identifies the 3D position of the box 33 based on measurement data of the 3D position measuring instrument 20. Then, the robot controller controls the operations of the robot body 2 and the holding device 10 so as to hold the box 33 based on the identified 3D position of the box 33, and makes the robot body 2 and the holding device 10 perform the box unpacking operation according to the given control program described above.

The cutting device 40 is suitably controlled by the system controlling device (not illustrated) described above. Note that the robot controller 3 may control the operation of the cutting device 40.

[Operation]

Next, operation of the box unpacking device 100 configured as described above is described. First, an outline of the operation of the box unpacking device 100 is described using FIGS. 2, 3, and 6.

Figure 6:
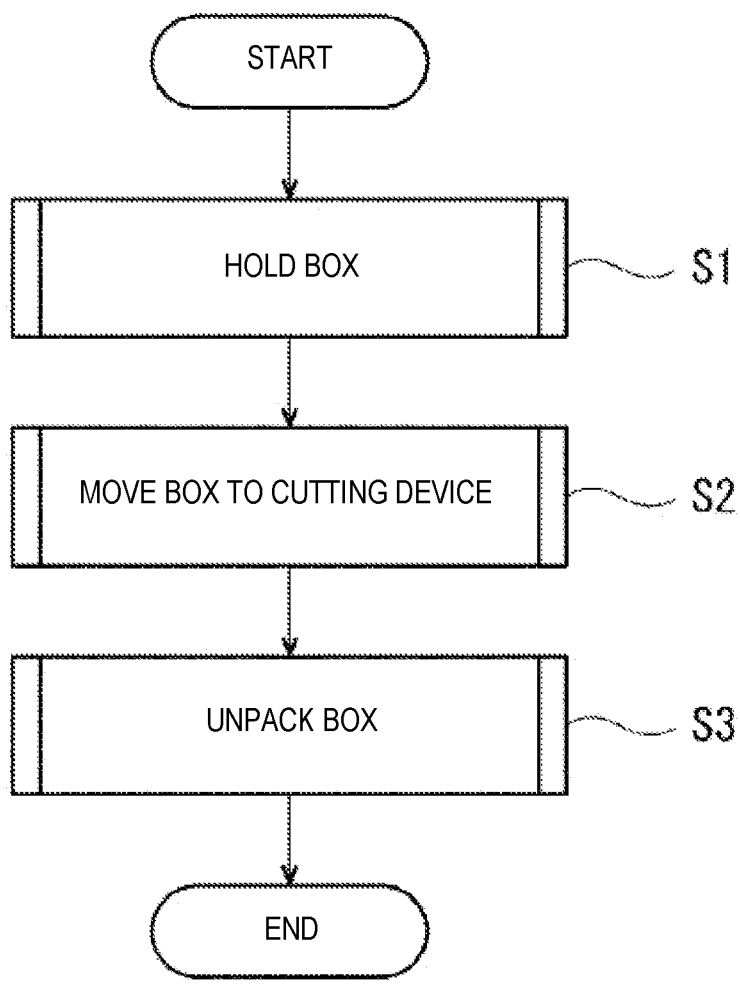
FIG. 6 is a flowchart illustrating the outline of a box unpacking operation of the box unpacking device of FIG. 1.
Figure 7:
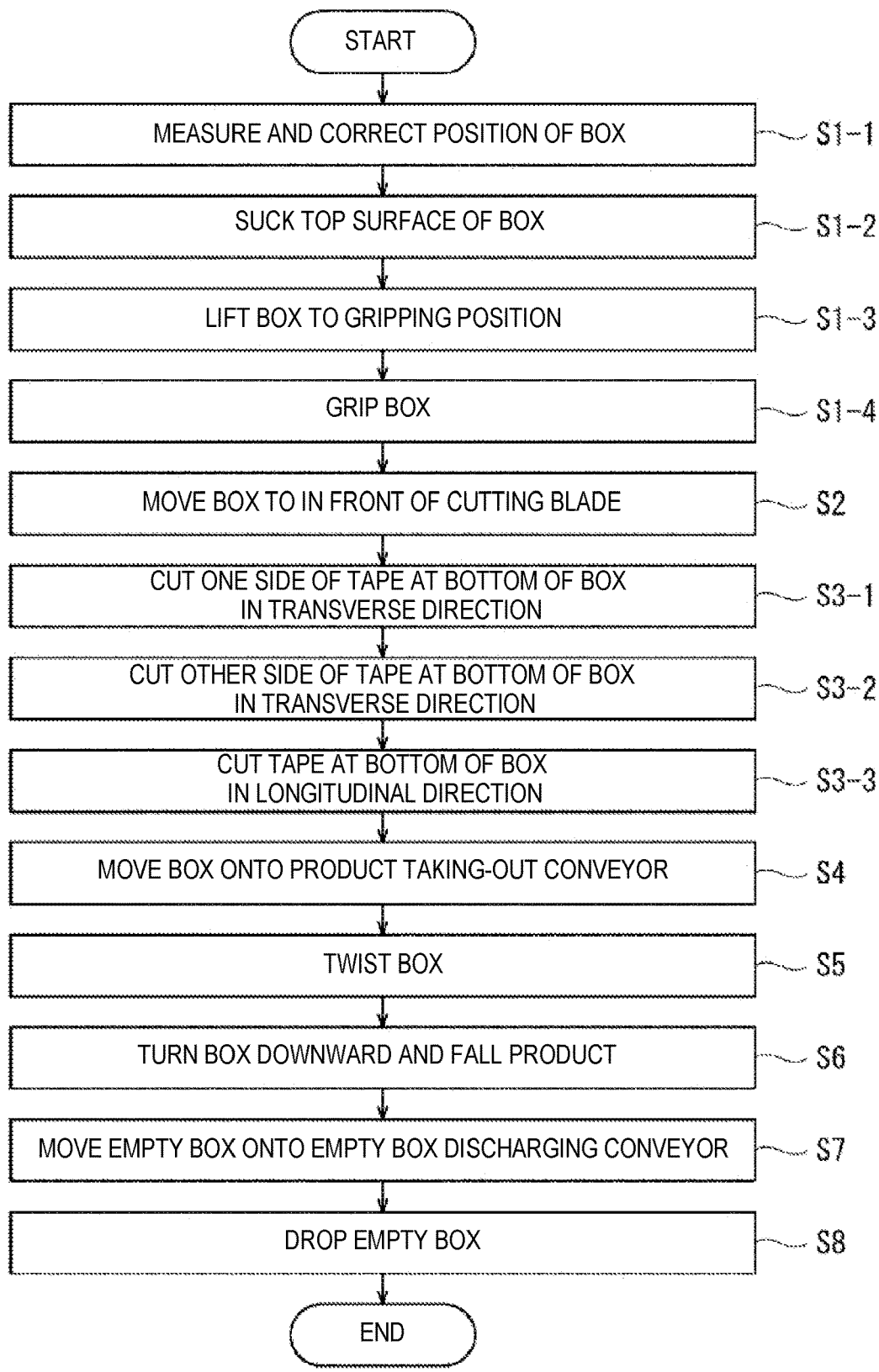
FIG. 7 is a flowchart illustrating the detail of the box unpacking operation of the box unpacking device of FIG. 1.

FIG. 6 is a flowchart illustrating the outline of the box unpacking operation by the box unpacking device of FIG. 1. The operations of the robot 1 and the holding device 10 are carried out by the control of the robot controller 3.

Referring to FIGS. 2, 3, and 6, the robot 1 holds the box 33 by using the holding device 10 (Step S1).

Next, the robot 1 moves the box 33 to the cutting device 40 (Step S2).

Then, the robot 1 unpacks the box 33 by using the cutting blade 41 of the cutting device 40 (Step S3).

Next, operation of the box unpacking device 100 is described in detail using FIGS. 2-4, 7, and 8A-8N. This detailed operation is carried out as follows, for example. Of course, it may be carried out by operation of other modes. Below, an operation under a holding mode in which the robot body 2 holds surfaces other than the bottom surface of the box 33 (the upper surface and the side surface) by positioning the wrist 2a above the box 33, is illustrated. Note that the cutting blade 41 is rotating.

First, as illustrated in FIG. 3, the robot 1 measures, by using the 3D position measuring instrument 20, the 3D position of one of the plurality of boxes 33 which constitute the box aggregate 32 on the pallet 31, of which the top surface is exposed and which is located at the given position. Although the box 33 of the measurement target is designated in advance by the given control program and its 3D position is also identified, since the actual 3D position of the box 33 includes an error originating from the position error of the pallet 31, the arrangement error of the box 33 when forming the box aggregate 32, etc., it is corrected to a 3D position which is obtained by measuring the error (Step S1-1). Particularly, in the box unpacking device 100, since the box 33 is griped by the pair of gripper members 13A and 13B of the holding device 10, it is important for the 3D position of the box 33 to be exact in order to grip the box 33 correctly.

Figure 8A:
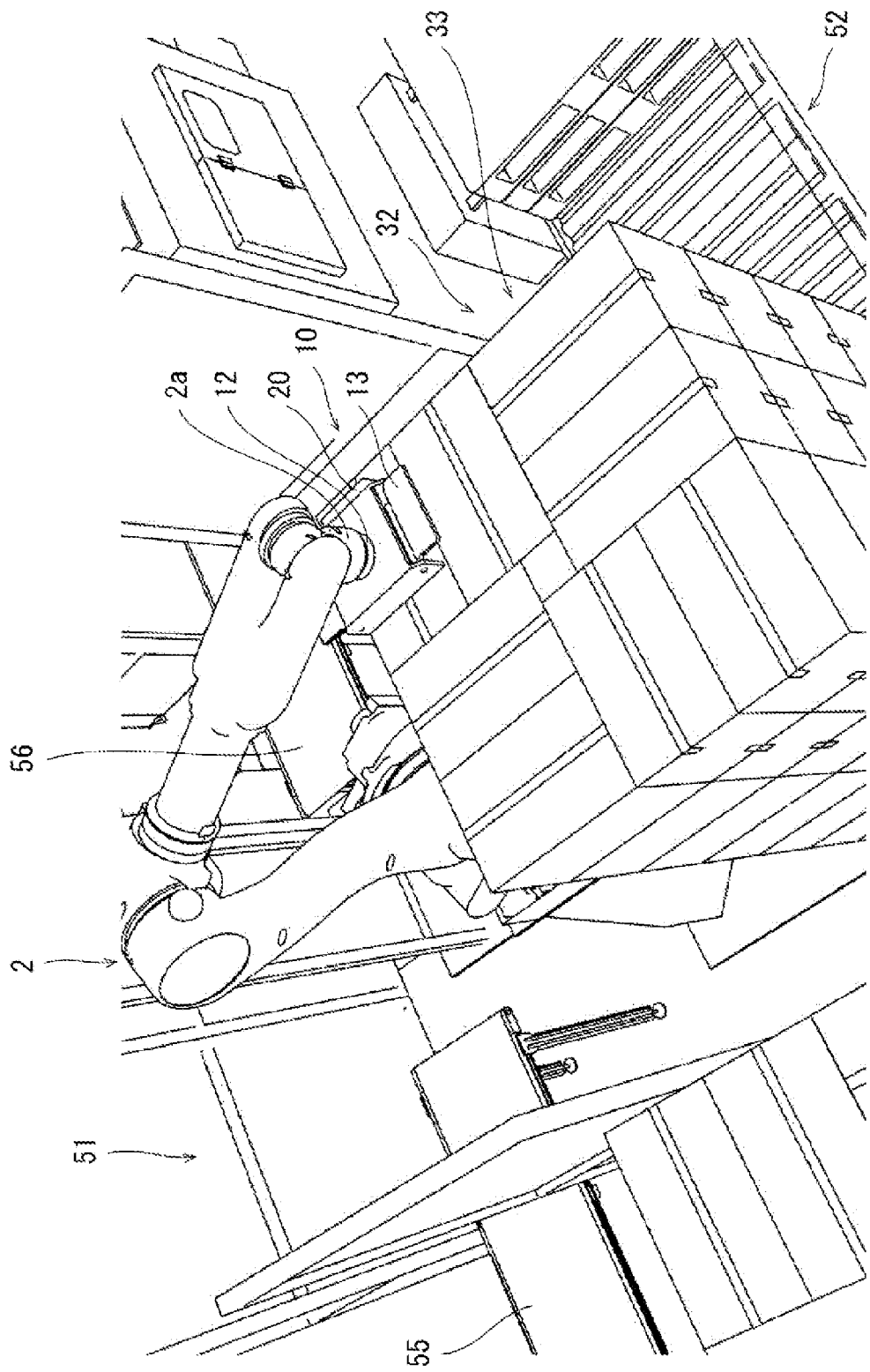
FIG. 8A is a view illustrating a box lifting operation which is the second half of the depalletizing operation.

Next, as illustrated in FIG. 8A, the robot 1 sucks the top surface of the designated box 33 by using the suction part 18 (see FIG. 4) (Step S1-2).

Figure 8B:
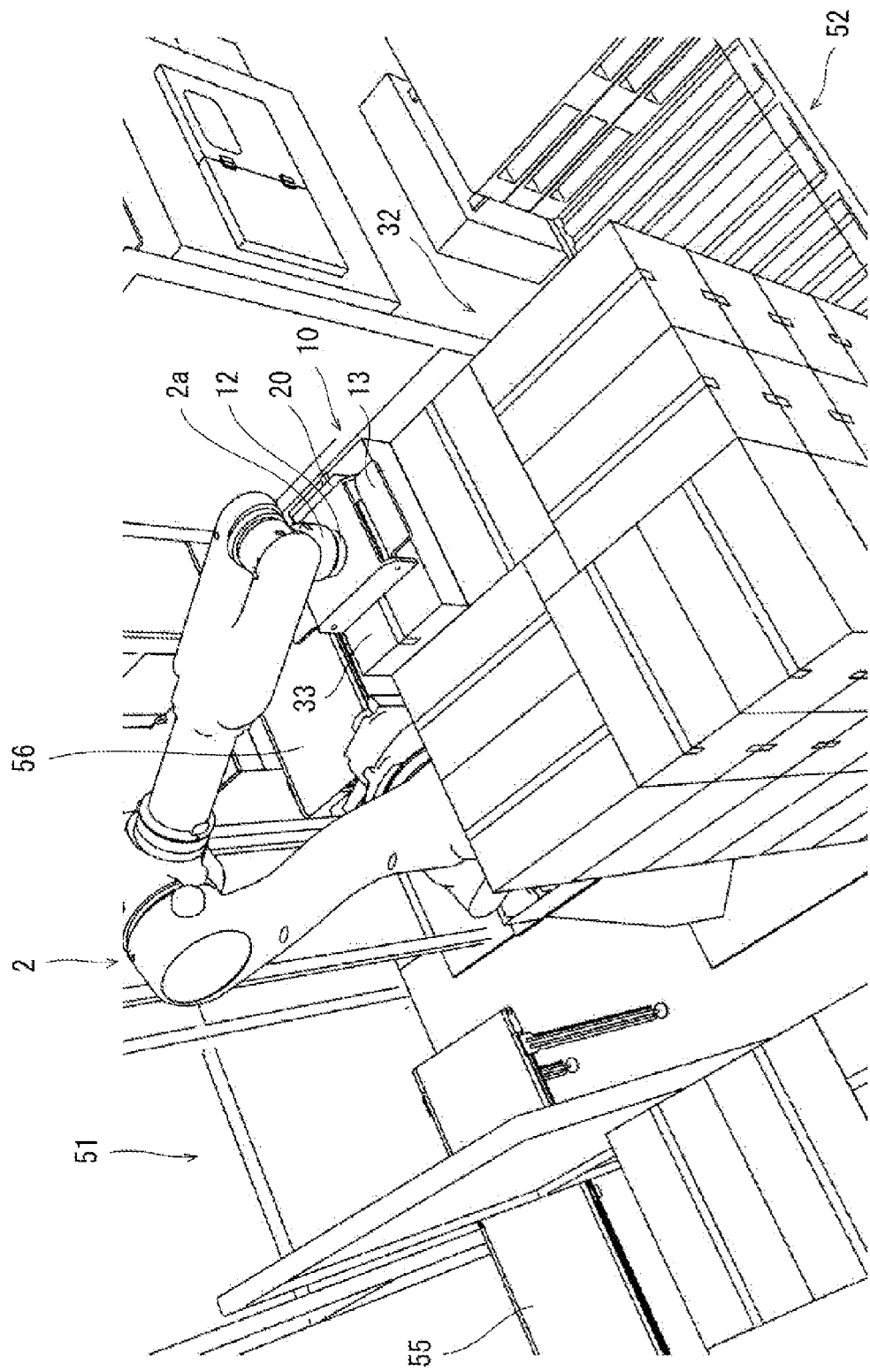
FIG. 8B is a view illustrating the box lifting operation which is the second half of the depalletizing operation.

Next, as illustrated in FIG. 8B, the robot 1 lifts the sucked box 33 to a given gripping position (Step S1-3).

Figure 8C:
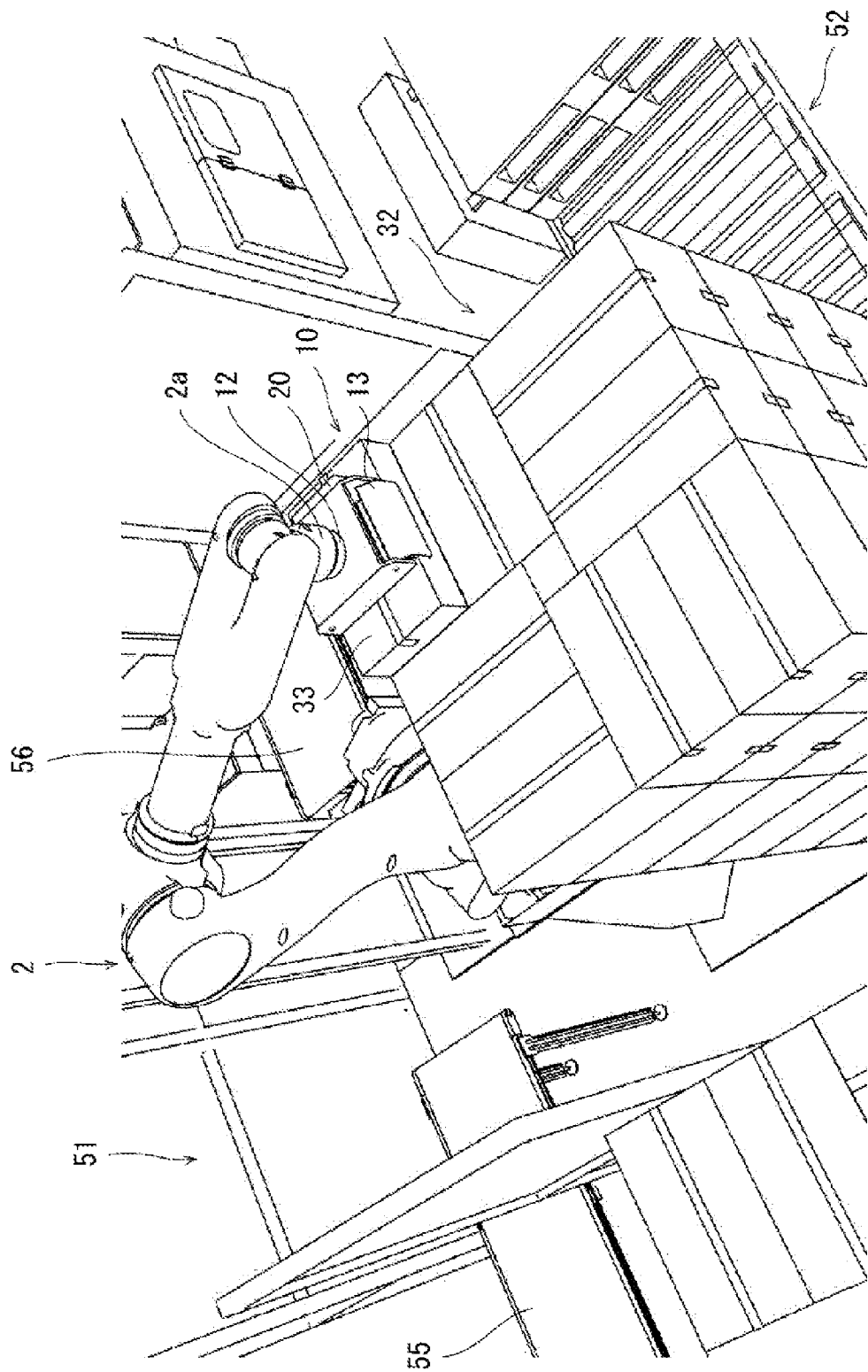
FIG. 8C is a view illustrating a cardboard box cutting operation.

Then, as illustrated in FIG. 8C, the robot 1 grips the upper part of the box by the pair of gripper members 13A and 13B (13) (Step S1-4). Therefore, the box 33 is held firmly by the robot 1, and it becomes possible to convey (move) the box 33.

Figure 8D:
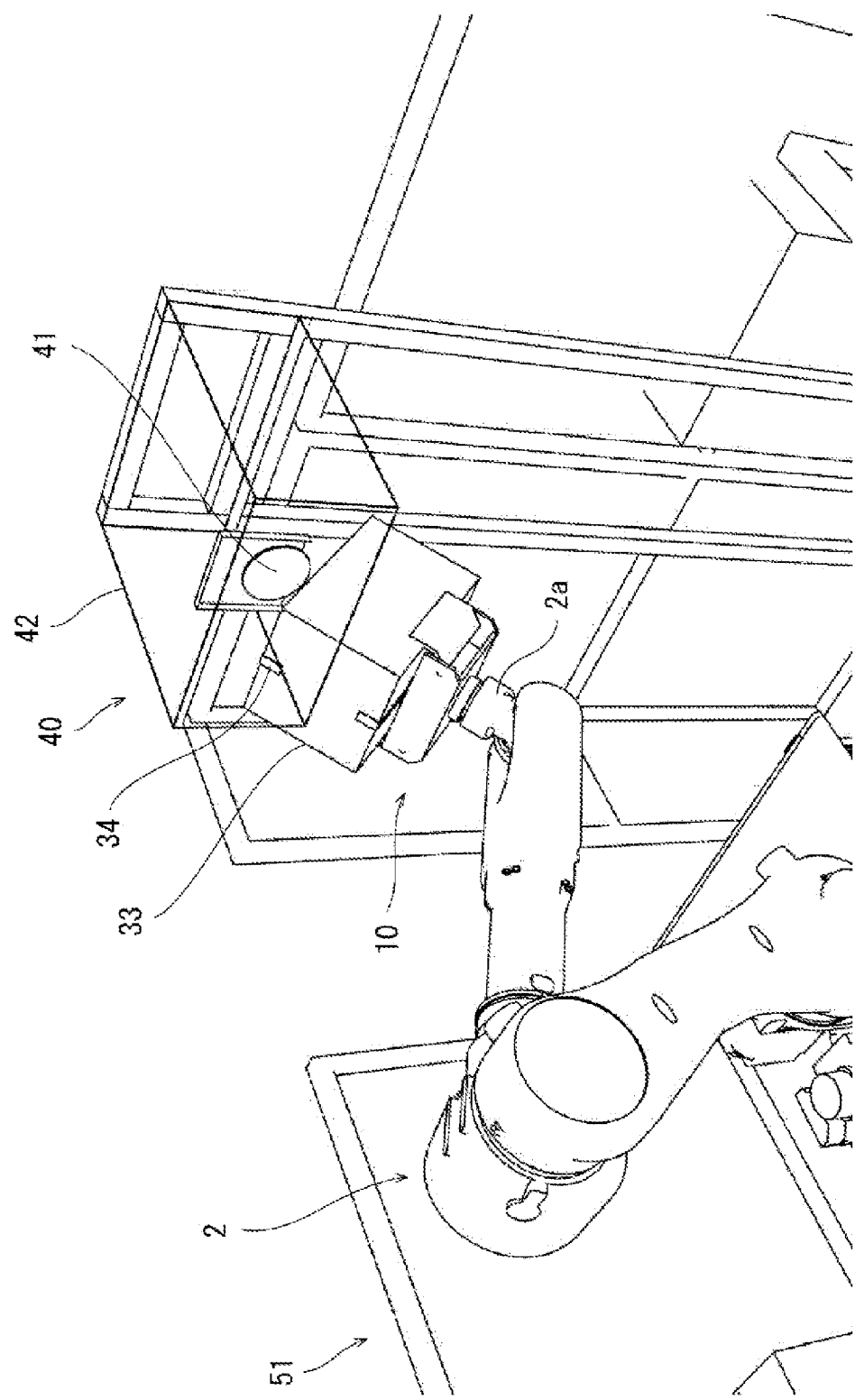
FIG. 8D is a view illustrating the cardboard box cutting operation.

Next, as illustrated in FIG. 8D, the robot 1 moves the held box 33 to in front of the cutting blade 41 of the cutting device 40 (Step S2). In detail, the robot 1 changes the angle of the box 33 in the rotating direction in which the box is flipped upside down when holding the box 33 to change the posture of the box 33 so that the top surface of the held box 33 is turned obliquely upward. By this posture change, the accommodated item(s) 36 (see FIG. 8I) inside the box 33 is brought closer to a lower part of the box 33. This forms a gap in an upper part of the interior space of the box 33. Since the gap is formed in the upper part of the interior space of the box 33, even when the cutting blade 41 relatively moves with respect to the box 33 while the point is stuck into the box, the cutting blade 41 will not damage the accommodated item(s) inside the box 33. Then, the robot 1 positions an end (a right end in FIG. 8D) of one of the short sides of the box 33 at the left side of a bottom end part of the cutting blade 41.

Then, the robot 1 moves the box 33 horizontally to the right side in FIG. 8D along an extending surface of the cutting blade 41.

Figure 8E:
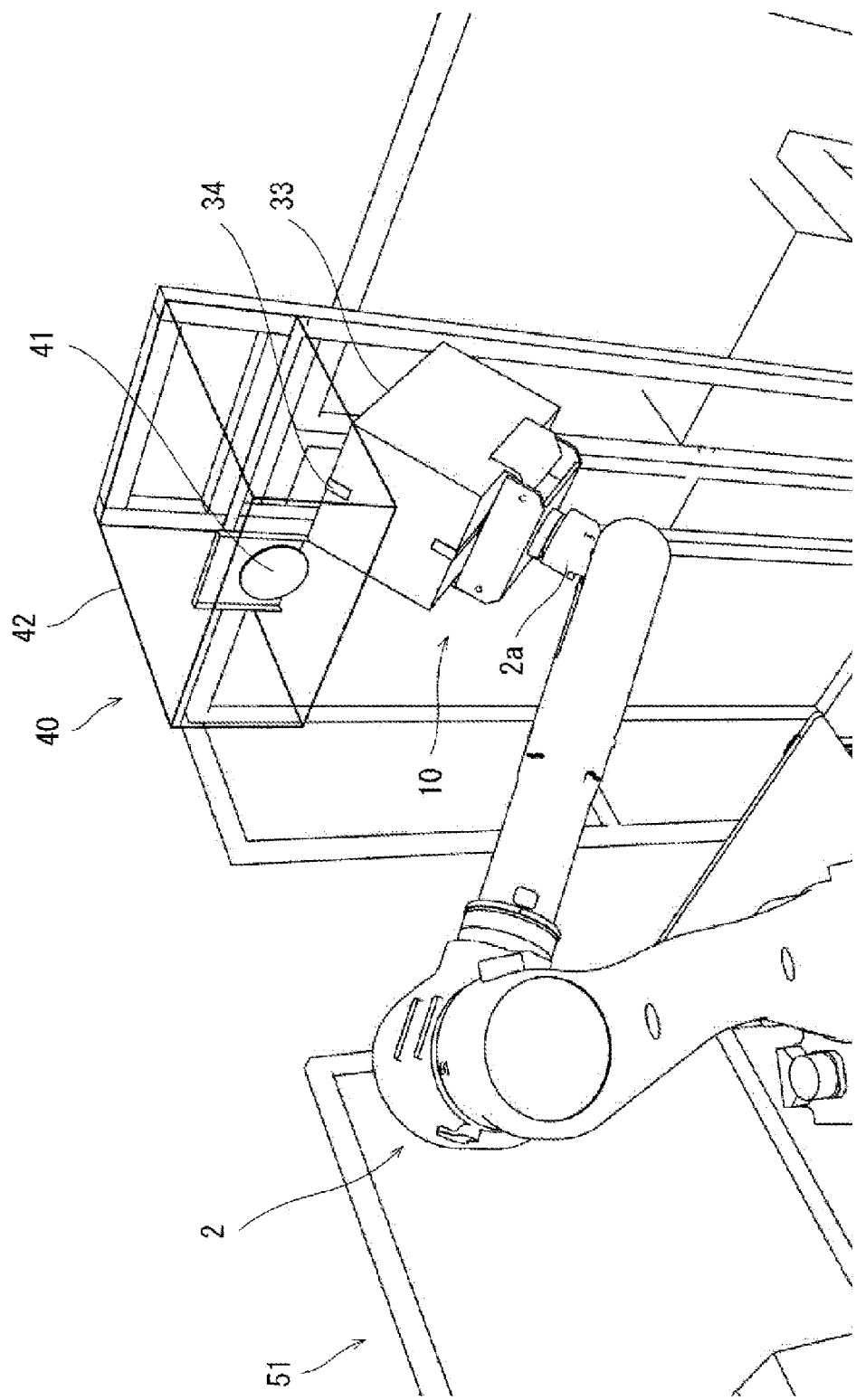
FIG. 8E is a view illustrating the cardboard box cutting operation.

Therefore, as illustrated in FIG. 8E, one side of the tape 34 at the bottom side of the box 33 is cut in the transverse direction (Step S3-1). Note that, in the case of the H-shaped tape pasting mode, the tape corresponding to one of the short sides of the box 33 is also cut. Moreover, the cutting operation described above is carried out by moving the box 33 in a vertical plane including the extending surface of the point of the cutting blade 41.

Figure 8F:
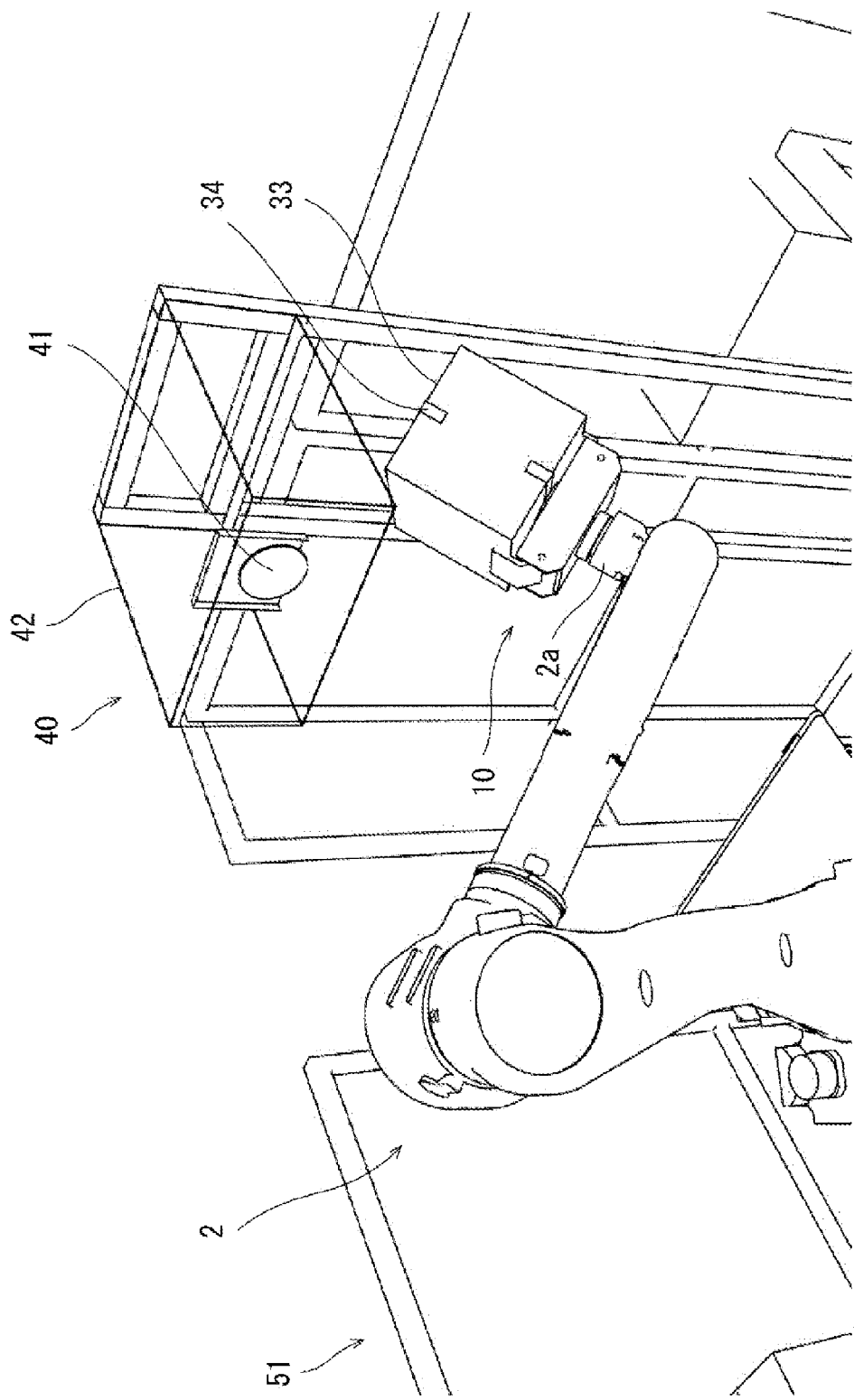
FIG. 8F is a view illustrating the cardboard box cutting operation.
Figure 8G:
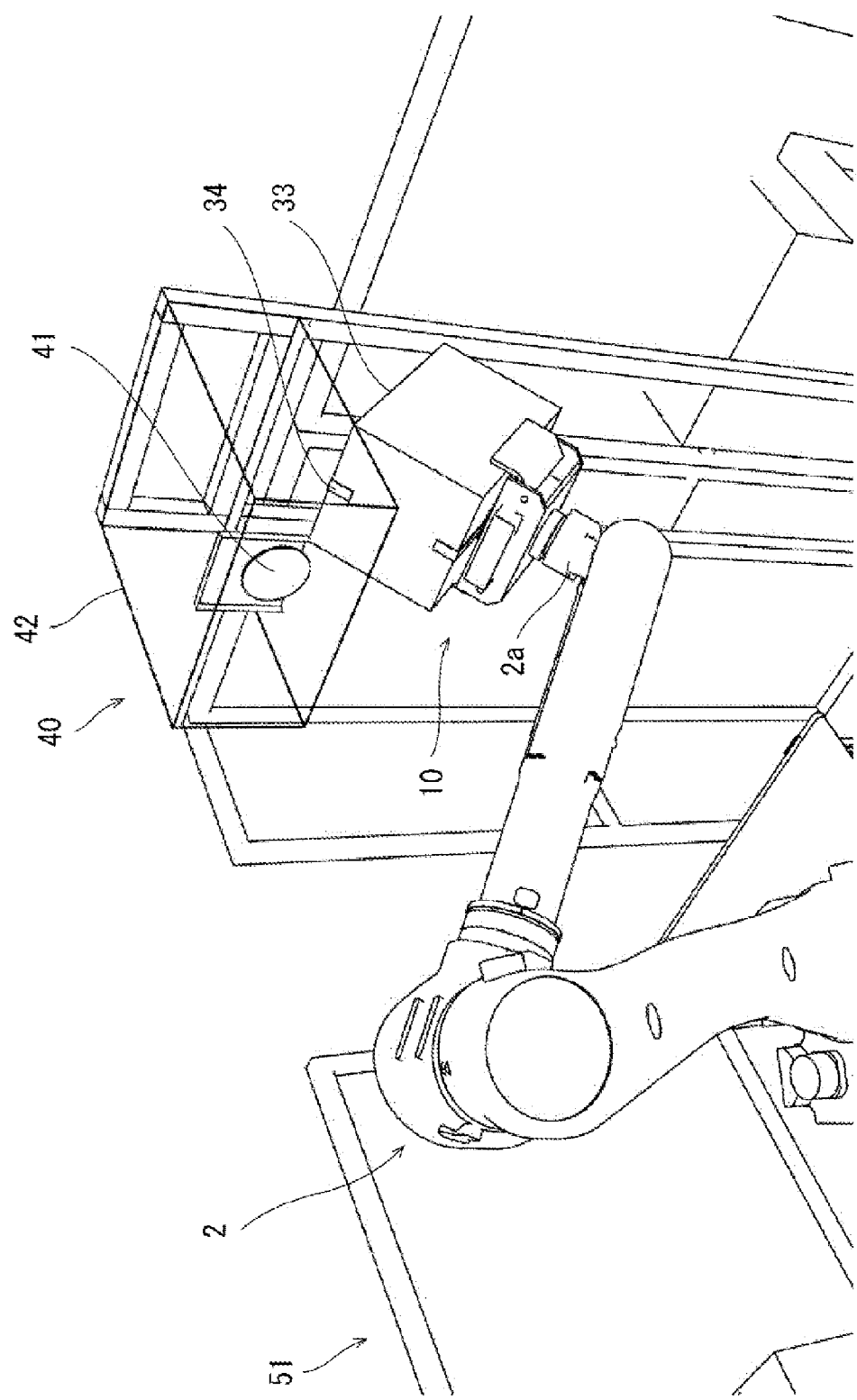
FIG. 8G is a view illustrating the cardboard box cutting operation.

Next, as illustrated in FIG. 8F-8G, the robot 1 rotates the box 33 by 180 degrees on the center axis of the wrist 2a (the reference axis AR of the holding device 10), and then cuts the other side of the tape 34 at the bottom side of the box 33 in the transverse direction, similarly to Step S3-1 (Step S3-2). Note that, in the case of the H-shaped tape pasting mode, the tape corresponding to the other short side of the box 33 is also cut.

Figure 8H:
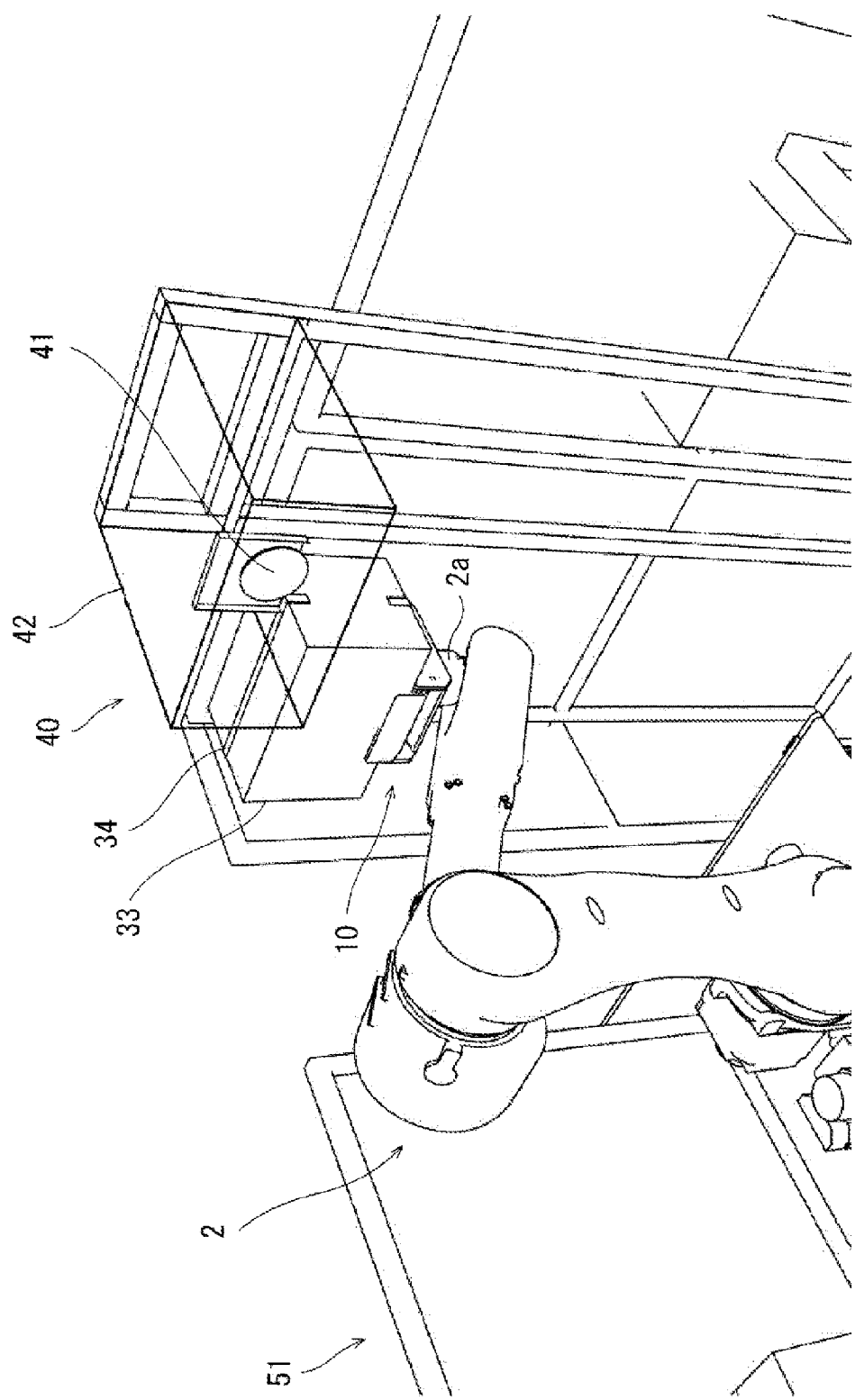
FIG. 8H is a view illustrating the cardboard box cutting operation.

Then, as illustrated in FIG. 8H, the robot 1 turns the box 33 vertically upward by rotating the box 33 by 90 degrees on the center axis of the wrist 2a, and positions the center of one side of the short sides (right side in FIG. 8H) of the box 33, at the left side of the bottom end of the cutting blade 41.

Figure 8I:
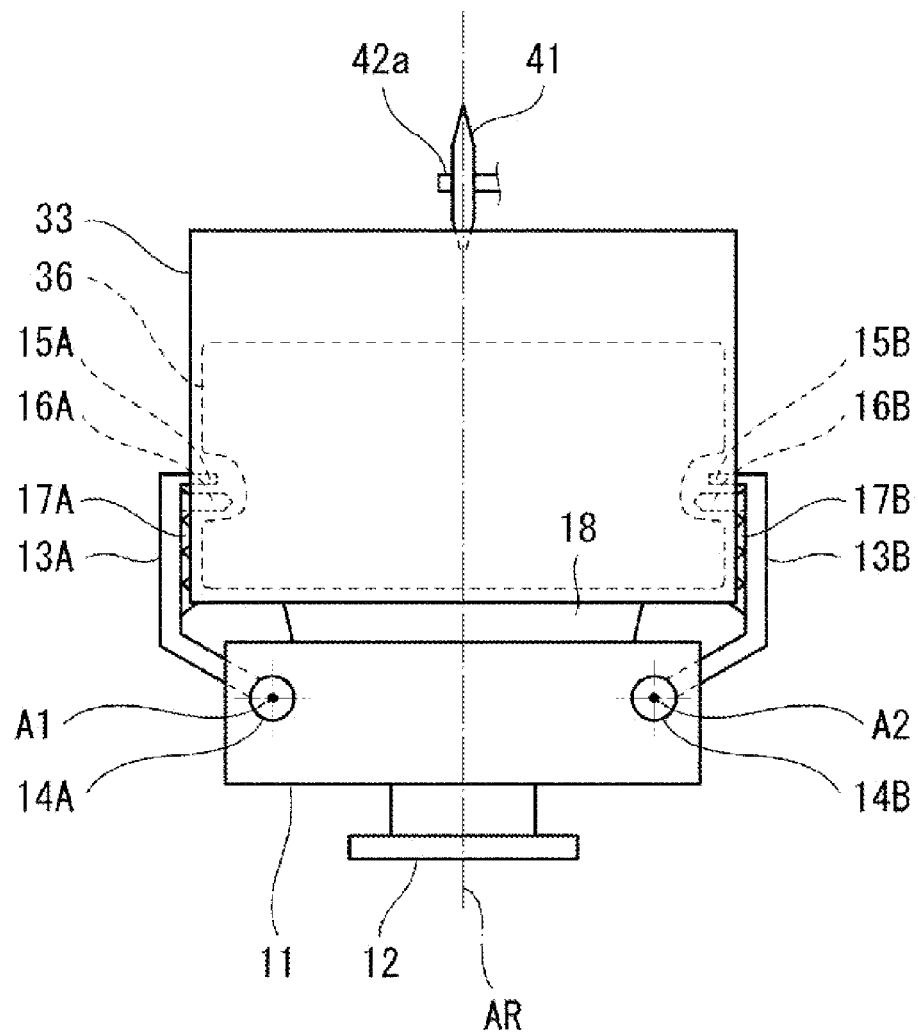
FIG. 8I is a view illustrating a situation inside a box during the cardboard box cutting.

Then, the robot 1 moves the box 33 horizontally to the right side in FIG. 8H along the extending surface of the cutting blade 41. At this time, as illustrated in FIG. 8I, since the accommodated item(s) 36 inside the box 33 is brought closer to the lower part of the box 33 and the gap is formed in the upper part of the interior space of the box 33, the cutting blade 41 will not damage the accommodated item(s) inside the box 33.

Figure 8J:
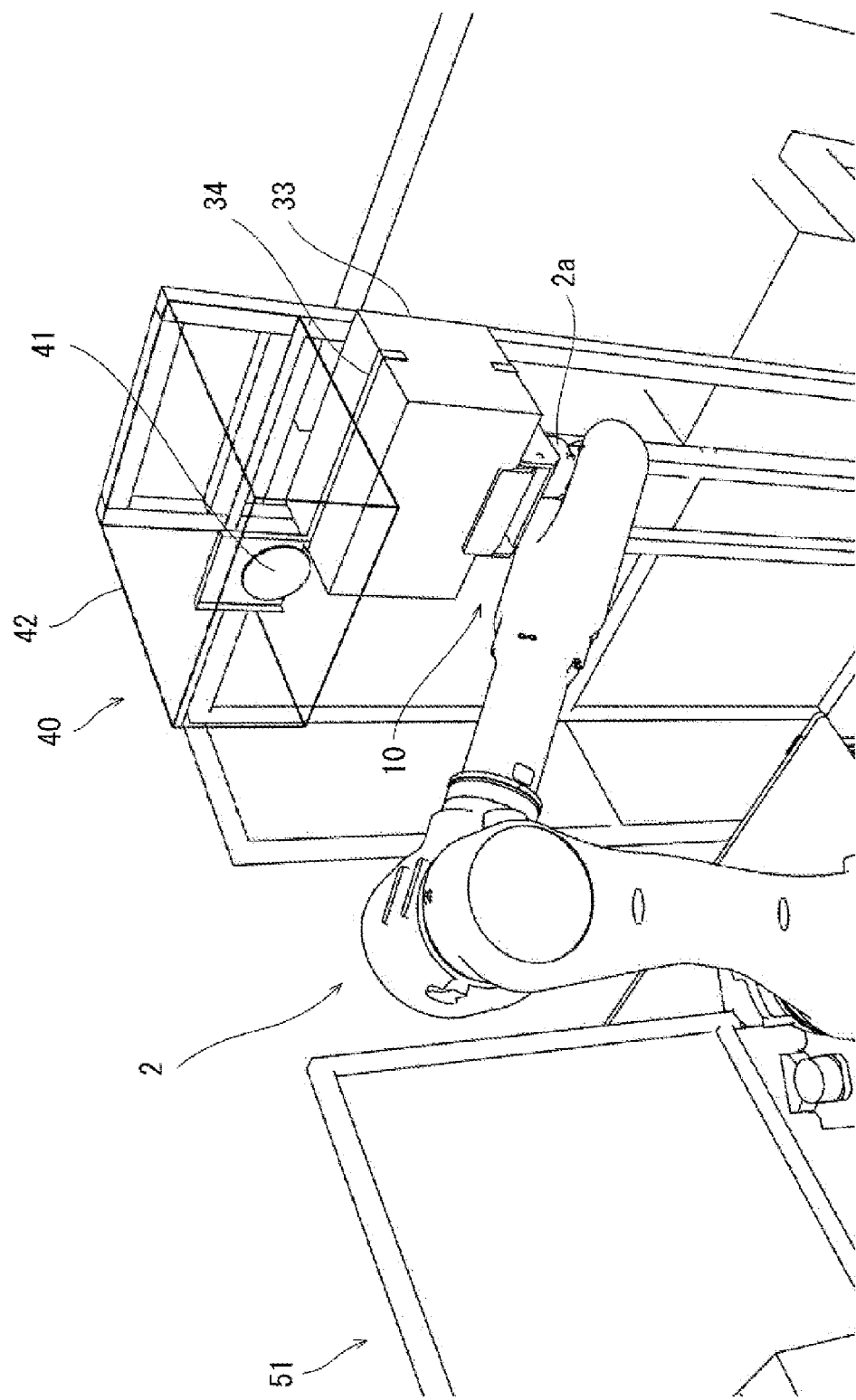
FIG. 8J is a view illustrating the cardboard box cutting operation.

Therefore, as illustrated in FIG. 8J, the part located in the bottom surface of the tape 34 at the bottom side of the box 33 is cut in the longitudinal direction (Step S3-3). Note that, in the case of the H-shaped tape pasting mode, the part located in the bottom surface of the tape 34 at the bottom side of the box 33 is similarly cut in the longitudinal direction. Moreover, the cutting operation at Step S3-3 is also carried out by moving the box 33 in the vertical plane including the extending surface of the point of the cutting blade 41.

As a result, the sealed state of the bottom wall of the box 33 is canceled by cutting all the tapes 34 pasted on the flaps 33b.

Next, the robot 1 moves the box 33 onto the product taking-out conveyor 55 which is an accommodated item table (Step S4).

Figure 8K:
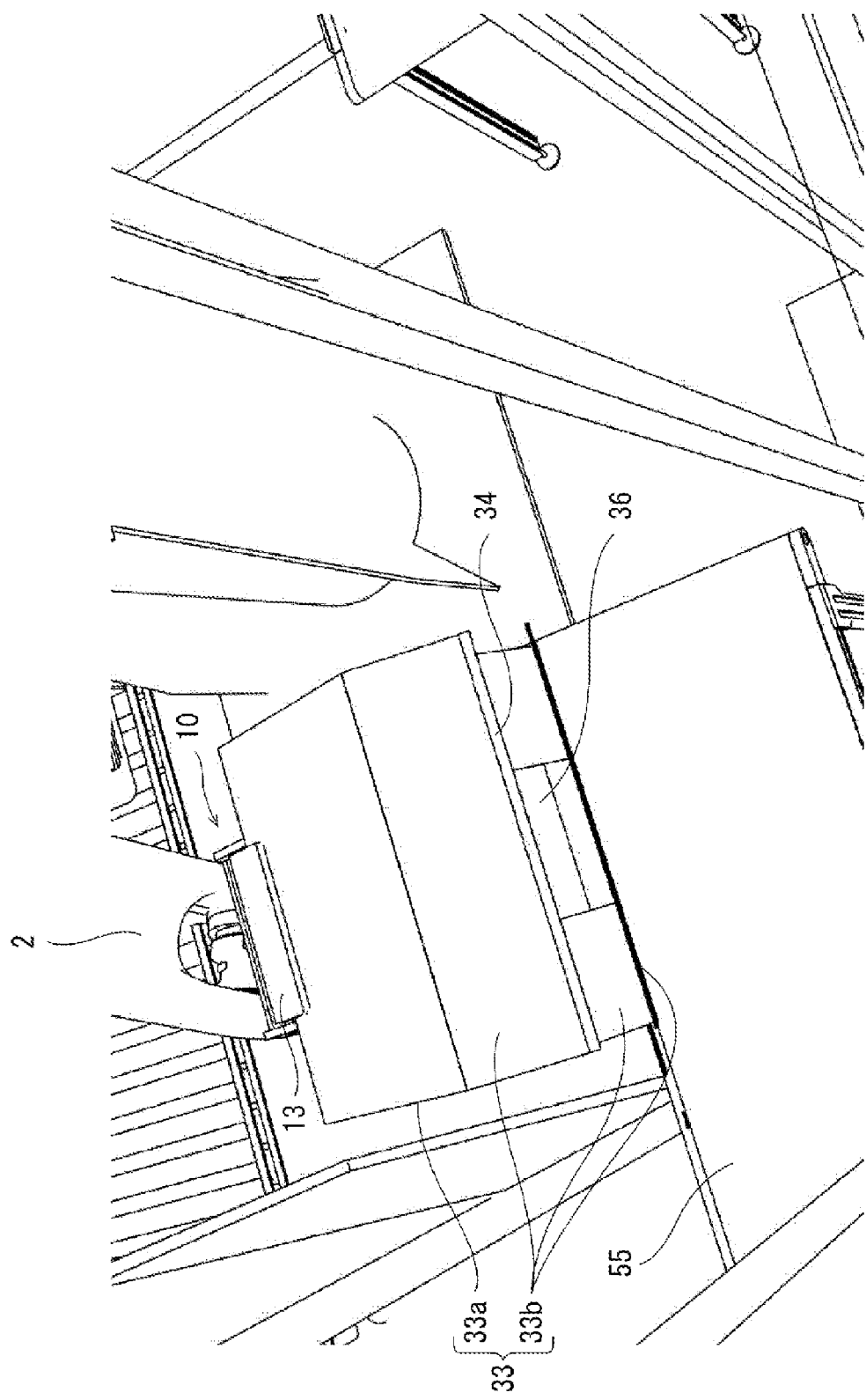
FIG. 8K is a view illustrating product(s) (accommodated item(s)) taking-out operation.
Figure 8L:
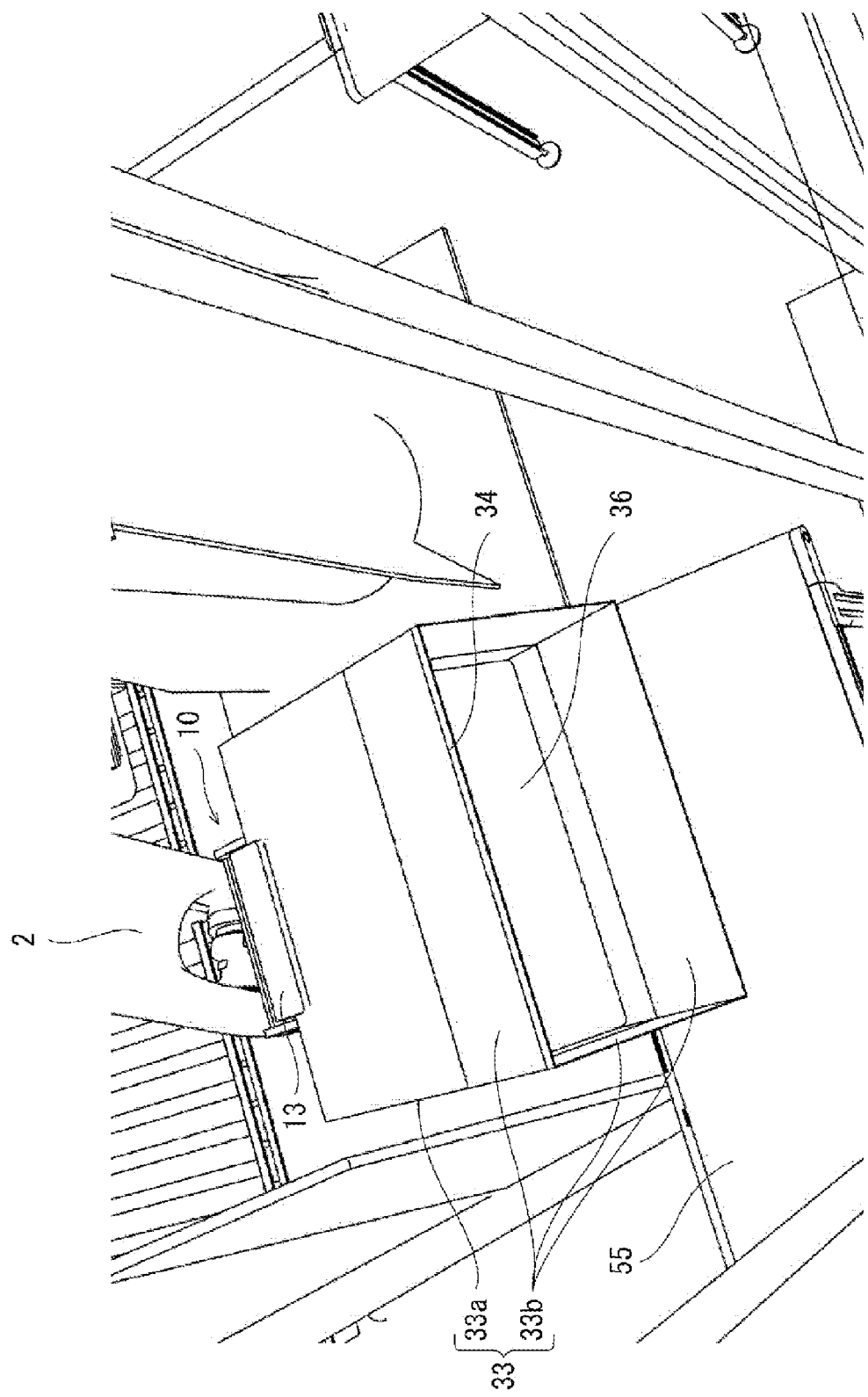
FIG. 8L is a view illustrating the product(s) (accommodated item(s)) taking-out operation.

Then, as illustrated in FIGS. 8K and 8L, the robot 1 twists the box 33 so that the accommodated item(s) 36 is discharged from the box 33 onto the product taking-out conveyor 55, while pushing away the flaps 33b (Step S5).

In this case, the box 33 may be twisted so as to become sideways, or may be twisted so as to stand upright. Alternatively, the posture of the box 33 may be changed in modes other than twisting.

Figure 8M:
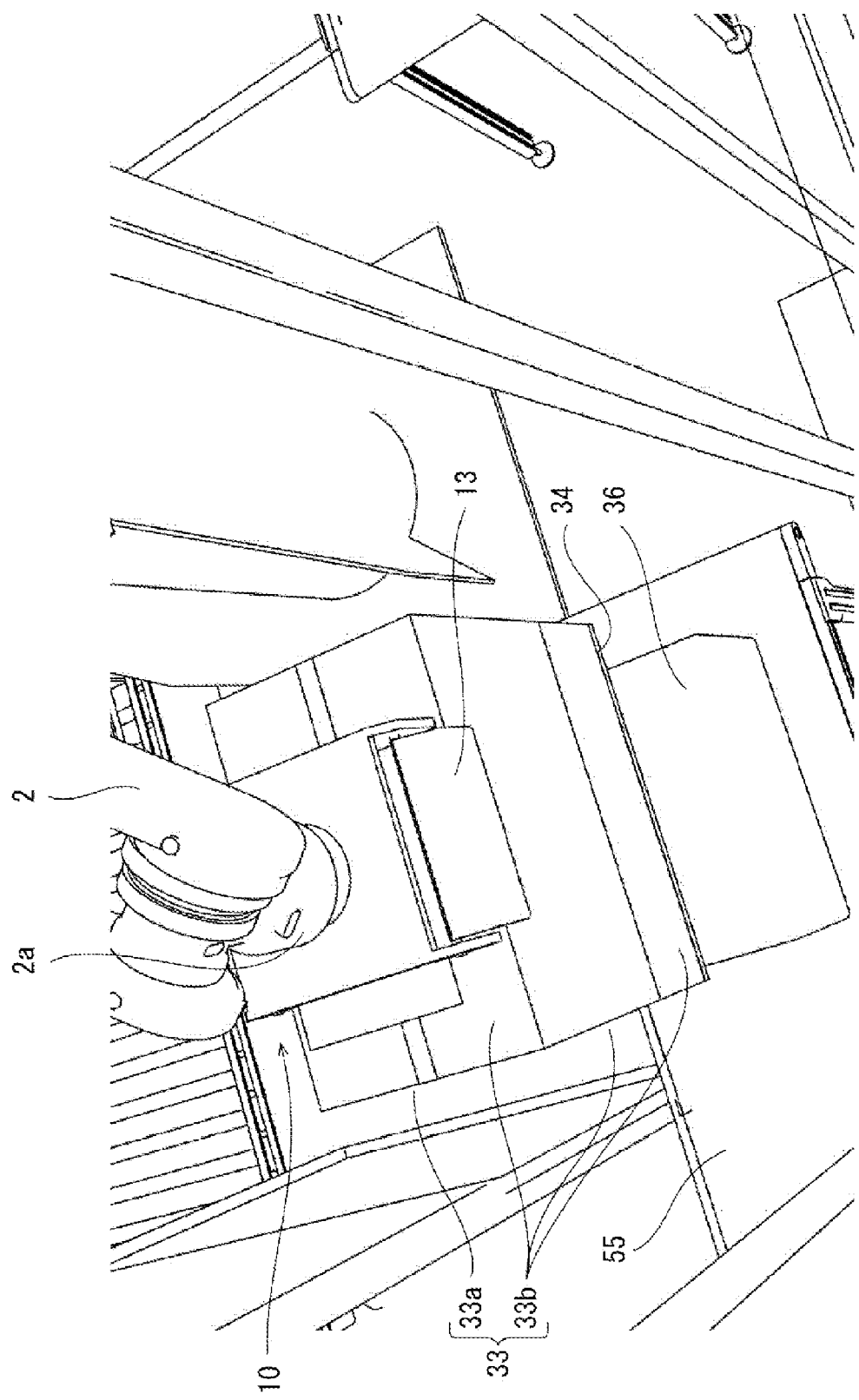
FIG. 8M is a view illustrating the product(s) (accommodated item(s)) taking-out operation.

Therefore, as illustrated in FIG. 8M, the accommodated items 36 accommodated inside the box 33 fall altogether onto the product taking-out conveyor 55 and are discharged (Step S6).

Next, as illustrated in FIG. 8N, the robot 1 moves the empty box 33 onto the empty box discharging conveyor 56 (Step S7).

Next, as illustrated in FIG. 8O, the robot 1 releases the box 33 by canceling the suction by the suction part 18 of the holding device 10 and canceling the gripping by the pair of gripper members 13. Then, the empty box 33 falls onto the empty box discharging conveyor 56 (Step S8). The fallen empty box 33 is taken out by the empty box discharging conveyor 56.

Then, the robot 1 repeats the operation described above.

According to such an embodiment, the robot 1 can change the angle of the box 33 held by the holding device 10 in the rotating direction in which the box is flipped upside down so that the surface of the box 33 to be cut open is turned to be perpendicular to the cutting blade 41, and can move the box 33 upward in the vertical plane to press the surface to be cut open against the cutting blade 41, and can move the box 33 in the extending direction of the cutting blade 41 in the vertical plane to cut open the surface to be cut open.

Therefore, the box 33 can be unpacked while dealing with the various sizes of the box 33 and various seal types. In addition, since the surface to be cut open is oriented upwardly when it is cut open, the accommodated item(s) 36 inside the box 33 is brought closer to the lower part by its own weight, thereby reducing the possibility of the damage to the accommodated item(s) 36 by the cutting blade 41.

Modification 1

Figure 9:
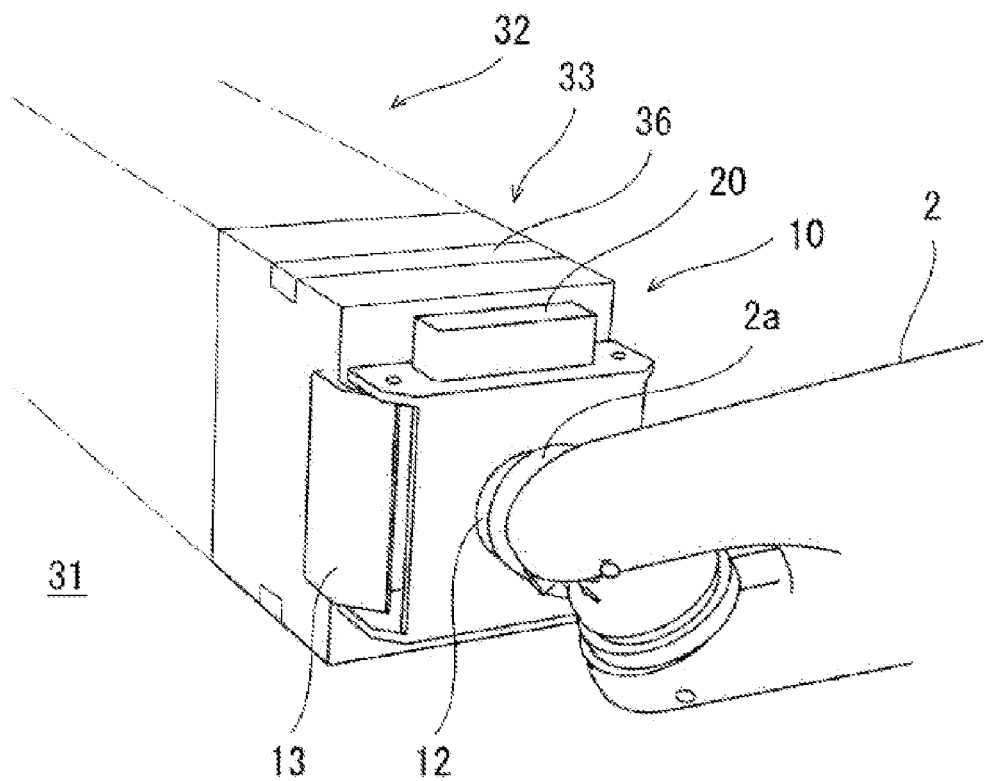
FIG. 9 is a view illustrating another mode of the depalletizing operation.

FIG. 9 is a view illustrating another mode of the depalletizing operation. Referring to FIG. 9, in Modification 1 of this embodiment, a plurality of boxes 33 are serially disposed on the pallet 31, as the box aggregate 32. The number of rows is not limited in particular. Such a case may be that the box 33 is vertically elongated, and when the boxes 33 are stacked, the box aggregate 32 becomes unstable, for example.

In this modification, the box 33 at the front end of the box row of the box aggregate 32 is the box located at the given position. At each point in time, the robot body 2 holds the surfaces other than the lower surface of the box 33 (here, three side surfaces (the front surface, the left side surface, and the right side surface)) located at the front end of the box row so that the wrist 2a is located forward (sideways) of the box 33.

Other matters are completely the same as the above embodiment.

According to Modification 1, when the box 33 located at the given position is disposed so that the side surface of the box 33 is able to be held, the box 33 located at the given position can be held easily, and the lower surface of the box 33 can be cut open.

Modification 2

Modification 2 is similar to the modification 1 other than followings.

In Modification 2, the robot body 2 holds the box 33 by using the holding device 10 similar to Modification 1, and then opens the box 33 without flipping the box 33 upside down. In detail, at Steps S3-1 to S3-3 of the flowchart in FIG. 7, the tape 34 at the top side of the box 33 is cut.

According to Modification 2, the upper surface in the arrangement state of the box 33 can be cut open. When the up-and-down direction does not exist in the accommodated item(s) 36, the opened box 33 is further flipped upside down to drop the accommodated item(s) 36, so that the accommodated item(s) 36 can be taken out from the box 33.

Other Embodiments

In the above embodiment, Modification 1, and Modification 2 (hereinafter, they are simply referred to as "the above embodiment"), the box unpacking device 100 may be provided with a manipulator for manipulating the robot 1, and unpack the box 33 by an operator manipulating the robot 1 using the manipulator. In this case, for example, the box unpacking device 100 may be configured so that the operator operates the robot body 2 and the holding device 10 without an intervention of the control device. Moreover, for example, a manipulation signal may be inputted into the robot controller 3 by the manipulation of the manipulator, and the box unpacking device 100 may be configured so that the robot controller 3 controls the operations of the robot body 2 and the holding device 10 according to the manipulation signal.

In the above embodiment, the box 33 may not be sealed by the tape 34. For example, the box 33 may be sealed by engaging the flaps with each other, or pasting the flaps together. Alternatively, the box 33 may be sealed by attaching the end walls by a suitable mounting member (fitting, fastening, etc.).

In the above embodiment, although the box holding part is provided with an upper wall holding part (suction part 18) and a pair of side wall holding parts (gripper members 13A and 13B), either one may be provided.

Moreover, although in the above embodiment the cardboard boxes 33 are stacked, the placing mode of the cardboard boxes 33 is not limited to this configuration. For example, rows of the cardboard boxes may be stacked in a plurality of stages. In such a case, the upper wall holding part (suction part 18) may be omitted.

Moreover, the direction in which the holding device 10 holds the cardboard box 33 is not limited in particular. For example, when the cardboard box 33 is placed so that the top wall is oriented sideways or downwardly, the holding device 10 may hold the cardboard box 33 from the side or below. In short, the holding device 10 may hold the cardboard box 33 so that the body part 11 becomes adjacent to the end wall of the cardboard box 33 at the opposite side of the end wall to be cut open.

Moreover, the box holding part (18, 13) may hold the cardboard box 33 by supporting the part of the cardboard box 33 other than the end wall to be cut open, and, for example, it may hold a ridge line part or a corner part of the cardboard box 33.

Although in the above embodiment the suction part 18 is illustrated as the upper wall holding part, the upper wall holding part may be able to hold and support the upper wall of the cardboard box 33. For example, the upper wall holding part may be provided with a pawl which can stick into the upper wall and support the cardboard box 33.

Although in the above embodiment the side wall holding part is comprised of the pair of gripper members 13A and 13B, the side wall holding part may support the side wall and hold the cardboard box 33. For example, the side wall holding part may pinch the pair of side walls by moving in the left-and-right direction.

Moreover, although in the above embodiment the gripper member 13 of the holding device 10 is driven by the pneumatic controlling circuit, the power source of the gripper member 13 is not limited to this configuration. For example, the gripper member 13 may be driven by a motor.

Moreover, in the above embodiment, the cutting device 40 may have a plurality of cutting blades 41.

Moreover, in the above embodiment, the 3D position measuring instrument 20 may be omitted.

It is apparent for the person skilled in the art that many improvements and other embodiments are possible from the above description. Therefore, the above description is to be interpreted only as illustration.

INDUSTRIAL APPLICABILITY

The box unpacking device of the present disclosure is useful in the technical field of devices configured to open the box which is boxed and sealed, and take out the accommodated item(s) inside the box.

DESCRIPTION OF REFERENCE CHARACTERS

1 Robot
2 Robot Body
2a Wrist
3 Robot Controller
10 Holding Device
11 Body Part
12 Attaching Part
13, 13A, 13B Gripper Member
15A, 15B Pawl
17A, 17B Friction Member
18 Suction Part
20 3D Position Measuring Instrument (Box Position Detector)
31 Pallet
32 Box Aggregate
33 Cardboard Box (Box)
33a Body Part
33b Flap
34 Adhesive Tape (Tape)
36 Accommodated Item
40 Cutting Device
41 Cutting Blade
42 Carrier
51 Depalletizing Area
52 Actual Pallet Conveyor
53 Pallet Magazine
54 Bag Unpacking Machine
55 Product Taking-out Conveyor
56 Empty Box Discharging Conveyor 100 Box Unpacking Device
Pr Processor
Me Memory

What is claimed is:

1. A box unpacking device, comprising:
a robot; and
a cutting device,
wherein a robot hand is attached to a wrist of the robot,
wherein the robot hand has a holding device configured to hold a packed box,
wherein the cutting device has a cutting blade of which the point is oriented downward or obliquely downward, and
wherein the robot moves the box held by the holding device in a vertical plane.

2. The box unpacking device of claim 1, wherein the robot includes:
a robot body including the wrist to which the robot hand having the holding device is attached; and
a robot controller configured to control operation of the robot body and the holding device, and
wherein the robot controller controls the robot body so that the robot body holds the box located at a given position by the holding device and moves the box held by the holding device at least in the vertical plane to cut open an upwardly oriented surface of the box by the cutting blade to open the box.

3. The box unpacking device of claim 2, wherein the controller controls the robot body so that the robot body holds a surface of the box other than the upper surface while placing the wrist at the side of the box, and then moves the box at least in the vertical plane to cut open the upper surface of the box by the cutting blade to open the box.

4. The box unpacking device of claim 2, wherein the robot controller controls the robot body so that the robot body opens the box held by the holding device, and turns the surface cut open by the cutting blade downward to drop an accommodated item of the box.

5. The box unpacking device of claim 2, wherein the boxes are placed as a box aggregate on a pallet,
wherein the holding device is provided with a box position detector configured to detect the position of the box, and
wherein the robot controller holds, by the holding device, the box located at the given position of the box aggregate placed on the pallet based on the position of the box detected by the box position detector.

6. The box unpacking device of claim 1, wherein the robot further changes an angle of the box held by the holding device in a rotating direction in which the box is flipped upside down.

7. The box unpacking device of claim 6, wherein the robot includes:
a robot body including the wrist to which the robot hand having the holding device is attached; and
a robot controller configured to control operation of the robot body and the holding device, and
wherein the robot controller controls the robot body so that the robot body changes the angle of the box held by the holding device at least in the rotating direction in which the box is flipped upside down, and then cuts open, by the cutting blade, a surface of the box that is oriented upward or obliquely upward to open the box.

8. The box unpacking device of claim 7, wherein the robot controller controls the robot body so that the robot body holds at least the upper surface of the box while placing the wrist above the box, then changes the angle of the held box in the rotating direction in which the box is flipped upside down, and then moves the box at least in the vertical plane to cut open, by the cutting blade, a lower surface of the box that is oriented upward or obliquely upward by the angle change to open the box.

9. The box unpacking device of claim 7, wherein the robot controller controls the robot body so that the robot body holds a surface of the box other than a lower surface while placing the wrist at the side of the box, then changes the angle of the held box in the rotating direction in which the box is flipped upside down, and then moves the box at least in the vertical plane to cut open, by the cutting blade, the lower surface of the box that is oriented upward or obliquely upward by the angle change to open the box.

10. The box unpacking device of claim 7, wherein the box has a bottom surface, a top surface opposing to the bottom surface, and a side surface connecting the entire perimeter of the bottom surface and the entire perimeter of the top surface,
wherein the box is located at a given position so that the top surface becomes the upper surface, and
wherein the robot controller controls the robot body so that the robot body holds a surface of the box other than the bottom surface while placing the wrist above the box, then changes the angle of the held box in the rotating direction in which the box is flipped upside down, and then moves the box at least in the vertical plane to cut open, by the cutting blade, the bottom surface of the box that is oriented upward or obliquely upward by the angle change to open the box, and then turns the bottom surface cut open by the cutting blade downward to drop an accommodated item of the box.

11. The box unpacking device of claim 1, wherein the cutting blade of the cutting device is disposed at a position where the robot is able to move the holding device of the robot hand below the cutting blade.

12. The box unpacking device of claim 1, wherein the robot is a vertical articulated robot.

13. A method of unpacking a box by using a box unpacking device including a robot and a cutting device, a robot hand being attached to a wrist of the robot, the robot hand having a holding device configured to hold a packed box, and the cutting device having a cutting blade of which the point is oriented downward or obliquely downward, comprising the step of:
(A) moving, by the robot, the box held by the holding device in a vertical plane.

14. The method of claim 13, wherein the robot includes:
a robot body including the wrist to which the robot hand having the holding device is attached; and
a robot controller configured to control operation of the robot body and the holding device, and
wherein the (A) moving the box includes controlling the robot body by the robot controller so that the robot body holds the box located at a given position by the holding device, and moves the box held by the holding device at least in the vertical plane to cut open an upwardly oriented surface of the box by the cutting blade to open the box.

15. The method of claim 14, wherein the (A) moving the box includes controlling the robot body by the controller so that the robot body holds a surface of the box other than the upper surface while placing the wrist at the side of the box, and then moves the box at least in the vertical plane to cut open the upper surface of the box by the cutting blade to open the box.

16. The method of claim 14, wherein the method includes (B) controlling the robot body by the robot controller so that the robot body opens the box held by the holding device, and then turns the surface cut open by the cutting blade downward to drop an accommodated item of the box.

17. The method of claim 14, wherein the boxes are placed as a box aggregate on a pallet,
- wherein the holding device is provided with a box position detector configured to detect the position of the box, and
- wherein the (A) moving the box includes holding, by the holding device, the box located at the given position of the box aggregate placed on the pallet based on the position of the box detected by the box position detector, by the robot controller.

18. The method of claim 13, wherein the (A) moving the box further includes changing, by the robot, an angle of the box held by the holding device in a rotating direction in which the box is flipped upside down.

19. The method of claim 18, wherein the robot includes:
- a robot body including the wrist to which the robot hand having the holding device is attached; and
- a robot controller configured to control operation of the robot body and the holding device, and
- wherein the (A) moving the box includes controlling the robot body by the robot controller so that the robot body changes the angle of the box held by the holding device at least in the rotating direction in which the box is flipped upside down, and cuts open, by the cutting blade, a surface of the box that is oriented upward or obliquely upward to open the box.

20. The method of claim 19, wherein the (A) moving the box includes controlling the robot body by the robot controller so that the robot body holds at least the upper surface of the box while placing the wrist above the box, then changes the angle of the held box in the rotating direction in which the box is flipped upside down, and then moves the box at least in the vertical plane to cut open, by the cutting blade, a lower surface of the box that is oriented upward or obliquely upward by the angle change to open the box.

21. The method of claim 19, wherein the (A) moving the box includes controlling the robot body by the robot controller so that the robot body holds a surface of the box other than a lower surface while placing the wrist at the side of the box, then changes the angle of the held box in the rotating direction in which the box is flipped upside down, and then moves the box at least in the vertical plane to cut open, by the cutting blade, the lower surface of the box that is oriented upward or obliquely upward by the angle change to open the box.

22. The method of claim 19, wherein the box has a bottom surface, a top surface opposing to the bottom surface, and a side surface connecting the entire perimeter of the bottom surface and the entire perimeter of the top surface,
- wherein the box is located at a given position so that the top surface becomes the upper surface,
- wherein the box unpacking method includes the (A) moving the box and an additional process, and
- wherein the (A) moving the box and the additional process includes controlling the robot body by the robot controller so that the robot body holds a surface of the box other than the bottom surface while placing the wrist above the box, then changes the angle of the held box in the rotating direction in which the box is flipped upside down, and then moves the box at least in the vertical plane to cut open, by the cutting blade, the bottom surface of the box that is oriented upward or obliquely upward by the angle change to open the box, and then turns the bottom surface cut open by the cutting blade downward to drop an accommodated item of the box.

23. The method of claim 13, wherein the cutting blade of the cutting device is disposed at a position where the robot is able to move the holding device of the robot hand below the cutting blade.

24. The method of claim 13, wherein the robot is a vertical articulated robot.

\* \* \* \* \*